US009301265B2

(12) United States Patent
Nagaraja et al.

(10) Patent No.: US 9,301,265 B2
(45) **Date of Patent: *Mar. 29, 2016**

(54) ACCESS POINT TRANSMIT POWER CONTROL

(75) Inventors: Sumeeth Nagaraja, San Diego, CA (US); Farhad Meshkati, San Diego, CA (US); Mehmet Yavuz, San Diego, CA (US); Suhas Mitra, San Diego, CA (US); Varun Khaitan, San Diego, CA (US); Vansh Pal Singh Makh, San Diego, CA (US); Chirag Sureshbhai Patel, San Diego, CA (US); Yeliz Tokgoz, San Diego, CA (US); Cong Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 13/241,130

(22) Filed: Sep. 22, 2011

(65) Prior Publication Data

US 2012/0252521 A1 Oct. 4, 2012

Related U.S. Application Data

(60) Provisional application No. 61/386,278, filed on Sep. 24, 2010, provisional application No. 61/387,433, filed on Sep. 28, 2010.

(51) Int. Cl.
*H04W 4/00* (2009.01)
*H04W 52/34* (2009.01)
(Continued)

(52) U.S. Cl.
CPC ............ *H04W 52/34* (2013.01); *H04B 17/391* (2015.01); *H04W 52/243* (2013.01); *H04W 52/244* (2013.01); *H04W 24/10* (2013.01); *H04W 88/08* (2013.01)

(58) Field of Classification Search
CPC ..... H04W 36/30; H04W 36/18; H04W 36/08; H04W 16/14; H04W 52/50; H04W 52/243; H04W 52/346; H04W 36/0055; H04B 1/1027; H04B 15/00
USPC .......... 455/436, 501, 522; 370/208, 328, 310, 370/311
See application file for complete search history.

(56) References Cited

U.S. PATENT DOCUMENTS 6,456,652 B1 9/2002 Kim et al.
6,977,912 B1 12/2005 Porter et al.
(Continued)

FOREIGN PATENT DOCUMENTS

CN 1237869 A 12/1999
CN 101496304 A 7/2009
(Continued)

OTHER PUBLICATIONS

"3rd Generation Partnership Project; Technical Specification Group Radio Access Network; Study on Minimization of drive-tests in Next Generation Networks; (Release 9)", 3GPP Standard; 3GPP TR 36.805, 3rd Generation Partnership Project (3GPP), Mobile Competence Centre ; 650, Route Des Lucioles ; F-06921 Sophia-Antipolis Cedex ; France, No. V9.0.0, Dec. 21, 2009, pp. 1-24, XP050401520, [retrieved on Dec. 21, 2009].
(Continued)

*Primary Examiner* — William D Cumming
(74) *Attorney, Agent, or Firm* — Jia J. Wu

(57) ABSTRACT

A power calibration scheme adjusts power levels of network of femtocells based on macro signals seen at different points in and around a coverage area and based on the mutual positions of the femtocells (e.g., based on femtocell signals seen at these points). The power calibration scheme thus facilitates a good balance between providing a desired level of coverage and mitigation of interference to nearby macrocells and femtocells.

43 Claims, 16 Drawing Sheets

(51) Int. Cl.

| | |
|---|---|
| ***H04W 52/24*** | (2009.01) |
| ***H04B 17/391*** | (2015.01) |
| *H04W 24/10* | (2009.01) |
| *H04W 88/08* | (2009.01) |

(56) References Cited

U.S. PATENT DOCUMENTS

| | | | | |
|---|---|---|---|---|
| 7,725,121 | B2 * | 5/2010 | Ishii | H04W 52/40 370/328 |
| 7,853,215 | B2 * | 12/2010 | Kurek | H04W 36/0055 370/311 |
| 8,014,827 | B2 * | 9/2011 | Saito | H04L 1/04 370/208 |
| 8,446,849 | B2 | 5/2013 | Damnjanovic | |
| 8,521,211 | B2 * | 8/2013 | Kobayashi | H04L 1/1845 455/436 |
| 8,812,047 | B2 * | 8/2014 | Carter | H04W 52/346 370/310 |
| 2004/0203717 | A1 | 10/2004 | Wingrowicz et al. | |
| 2007/0066329 | A1 | 3/2007 | Laroia et al. | |
| 2008/0069028 | A1 | 3/2008 | Richardson | |
| 2008/0188265 | A1 | 8/2008 | Carter et al. | |
| 2009/0042593 | A1 | 2/2009 | Yavuz et al. | |
| 2009/0122739 | A1 | 5/2009 | Yonezawa | |
| 2009/0279519 | A1 | 11/2009 | Brisebois et al. | |
| 2009/0291690 | A1 | 11/2009 | Guvenc et al. | |
| 2010/0035647 | A1 | 2/2010 | Gholmieh et al. | |
| 2010/0048212 | A1 | 2/2010 | Yavuz et al. | |
| 2010/0144338 | A1 | 6/2010 | Kim et al. | |
| 2010/0167771 | A1 | 7/2010 | Raghothaman et al. | |
| 2010/0208700 | A1 | 8/2010 | Shi et al. | |
| 2010/0273432 | A1 | 10/2010 | Meshkati et al. | |
| 2010/0273435 | A1 | 10/2010 | Sun et al. | |
| 2010/0273481 | A1 | 10/2010 | Meshkati et al. | |
| 2011/0018766 | A1 | 1/2011 | Steer et al. | |
| 2011/0019638 | A1 | 1/2011 | Hamel et al. | |
| 2011/0028180 | A1 | 2/2011 | Sawai | |
| 2011/0312328 | A1 | 12/2011 | Choi et al. | |
| 2012/0003970 | A1 | 1/2012 | Iwamura | |
| 2012/0039265 | A1 | 2/2012 | Patel et al. | |
| 2012/0046026 | A1 | 2/2012 | Chande et al. | |
| 2012/0046063 | A1 | 2/2012 | Chande et al. | |
| 2012/0142392 | A1 | 6/2012 | Patel et al. | |
| 2012/0238279 | A1 | 9/2012 | Yu et al. | |
| 2012/0252453 | A1 * | 10/2012 | Nagaraja | H04W 52/243 455/436 |
| 2012/0252521 | A1 * | 10/2012 | Nagaraja | H04W 52/243 455/522 |
| 2012/0282979 | A1 | 11/2012 | Ashraf et al. | |
| 2013/0044685 | A1 | 2/2013 | Fong et al. | |
| 2013/0044697 | A1 | 2/2013 | Yoo et al. | |
| 2013/0171999 | A1 | 7/2013 | Katar et al. | |
| 2013/0259012 | A1 | 10/2013 | Gormley et al. | |
| 2014/0135004 | A1 | 5/2014 | Patel et al. | |
| 2014/0334424 | A1 | 11/2014 | Huang et al. | |

FOREIGN PATENT DOCUMENTS

| | | | |
|---|---|---|---|
| CN | 101606322 | A | 12/2009 |
| EP | 2222098 | A1 | 8/2010 |
| EP | 2352344 | A1 | 8/2011 |
| GB | 2450123 | | 12/2008 |
| GB | 2467796 | A | 8/2010 |
| JP | H1146382 | A | 2/1999 |
| JP | 2000091988 | A | 3/2000 |
| JP | 2004207839 | A | 7/2004 |
| JP | 2007235831 | A | 9/2007 |
| JP | 2010062783 | A | 3/2010 |
| JP | 2010166164 | A | 7/2010 |
| KR | 100753283 | B1 | 8/2007 |
| KR | 20090123132 | A | 12/2009 |
| KR | 20100085442 | A | 7/2010 |
| WO | WO-2008157797 | | 12/2008 |
| WO | WO-2009022952 | A1 | 2/2009 |
| WO | WO-2009023596 | A2 | 2/2009 |
| WO | 2009054759 | A1 | 4/2009 |
| WO | WO 2009070608 | A2 | 6/2009 |
| WO | WO-2009120689 | A2 | 10/2009 |
| WO | WO-2009140312 | A2 | 11/2009 |
| WO | WO-2010006909 | A1 | 1/2010 |
| WO | WO-2010061530 | A1 | 6/2010 |
| WO | WO2010105232 | | 9/2010 |
| WO | WO-2012044698 | A1 | 4/2012 |
| WO | WO-2012177801 | A1 | 12/2012 |

OTHER PUBLICATIONS

International Search Report and Written Opinion—PCT/US2011/053111—ISA/EPO—Jan. 23, 2012.

Vodafone Group et al., "Methods and Tests to limit adjacent channel interference for Home NodeB", 3GPP Draft; R4-082020, 3rd Generation Partnership Project (3GPP), Mobile Competence Centre ; 650, Route Des Lucioles ; F-06921 Sophia-Antipolis Cedex; France, vol. RAN WG4, no. Jeju; Aug. 26, 2008, XP050180517, [retrieved on Aug. 26, 2008].

Kulkarni P., et al., "Radio Resource Management Considerations for LTE Femto Cells", ACM SIGCOMM Computer Communication Review, vol. 40, No. 1, Jan. 2010, pp. 26-30.

"LTE; Evolved Universal Terrestrial Radio Access (E-UTRA); TDD Home eNode B (HeNB) Radio Frequency (RF) requirements analysis (3GPP TR 36.922 version 9.1.0 Release 9)", Technical Report, European Telecommunications Standards Institute (ETSI), 650, Route des Lucioles ; F-06921 Sophia-Antipolis ; France, vol. 3GPP RAN, No. V9.1.0, Jul. 1, 2010, XP014047116, chapter 7; p. 48-p. 72.

Partial International Search Report—PCT/US2011/053111-ISA/EPO—Nov. 30, 2011.

Patel C, et al., "Femtocell and Beacon Transmit Power Self-Calibration", Internet Citation, [Online] pp. 1-8, XP002637750, Retrieved from the Internet: URL:http://www.qualcomm.com/documents/files/femtocell-and-beacon-transmitpower-self-calibration.pdf> [retrieved on May 16, 2011].

QUALCOMM Incorporated, "Enterprise Multi-Femtocell Deployment Guidelines," Jun. 2011, 39 pages.

3GPP TS 25.104 V9.2.0 (Dec. 2009), 3rd Generation Partnership Project; Technical Specification Group Radio Access Network; Base Station (BS) radio transmission and reception (FDD) (Release 9), 86 pages.

ETSI TS 125 331 V8.1.0 (Jan. 2008), Universal Mobile Telecommunications System (UMTS); Radio Resource Control (RRC); Protocol specification (3GPP TS 25.331 version 8.1.0 Release 8), 1467 pages.

Taiwan Search Report—TW100134431—TIPO—Apr. 21, 2014.

Weitzen, J., et al., "Comparing Coverage Quality for Femtocell and Macrocell Broadband Data Services", IEEE Communications Magazine, vol. 48, No. 1, Jan. 2010, pp. 40-44, ISSN: 0163-6804.

European Search Report—EP13191076—Search Authority—The Hague—Nov. 20, 2013.

Huawei: "Self-configuration considerations of Home NodeB", 3GPP TSG RAN WG3 Meeting #57, R3-071466, Aug. 2007.

Smaoui I., et al., "Heterogeneous Wireless Networks: Configuration and Vertical Handoff Management," Wireless Personal Communications, 2010, pp. 417-445, vol. 54 (3).

* cited by examiner

ACCESS POINT TRANSMIT POWER CONTROL

CLAIM OF PRIORITY

This application claims the benefit of and priority to commonly owned U.S. Provisional Patent Application No. 61/386,278, filed Sep. 24, 2010, and U.S. Provisional Patent Application No. 61/387,433, filed Sep. 28, 2010, the disclosure of each of which is hereby incorporated by reference herein.

CROSS-REFERENCE TO RELATED APPLICATION

This application is related to concurrently filed and commonly owned U.S. patent application Ser. No. 13/241,101, entitled "POWER CONTROL FOR A NETWORK OF ACCESS POINTS," the disclosure of which is hereby incorporated by reference herein.

BACKGROUND

1. Field

This application relates generally to wireless communication and more specifically, but not exclusively, to improving communication performance.

2. Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

As the demand for high-rate and multimedia data services rapidly grows, there lies a challenge to implement efficient and robust communication systems with enhanced performance. To supplement conventional network access points (e.g., macro access points), small-coverage access points (e.g., with transmit power of 20 dBm or less) may be deployed to provide more robust coverage for access terminals. For example, a small-coverage access point installed in a user's home or in an enterprise environment (e.g., commercial buildings) may provide voice and high speed data service for access terminals supporting cellular radio communication (e.g. CDMA, WCDMA, UMTS, LTE, etc.).

Conventionally, small-coverage access points may be referred to as, for example, femtocells, femto access points, home NodeBs, home eNodeBs, or access point base stations. Typically, such small-coverage access points are connected to the Internet and the mobile operator's network via a DSL router or a cable modem. For convenience, small-coverage access points may be referred to as femtocells or femto access points in the discussion that follows.

In practice, a tradeoff may need to be made between providing adequate femtocell radiofrequency (RF) coverage for users of the femtocell and limiting interference to other access points (e.g., nearby macrocells) and to users of these other access points. For example, for a femtocell that is deployed indoors, it may be desired to provide good indoor RF coverage throughout the entire building, while limiting outdoor leakage that would otherwise interfere with uplink and/or downlink communication of nearby access points.

Interference is caused in various ways. Due to scarcity of spectrum resources, femtocells often share the frequency channels used by the macrocells or are deployed on adjacent channels with a limited guard band. In either of these cases, femtocells and macrocells may interfere with each other on these channels.

Another cause of interference is beacon transmission. Macrocells typically operate on multiple frequencies. To attract the macrocell users to its service channel, a femtocell radiates beacons (e.g., comprising pilot, paging, and synchronization channels) on these macrocell frequencies. These beacons create interference on the macro network if there is no active hand-in support between the macrocell and femtocell. This interference can affect the voice call quality of users receiving active service on the macrocell frequency and, in some cases, lead to call drops.

In view of the above, it is desirable to calibrate femtocell service channel transmit power and femtocell beacon channel transmit power to provide adequate coverage while mitigating interference to the macro network. In some aspects, the desired power levels depend on the indoor area and propagation environment, as well as the prevalent macro network conditions. For example, traditional interference mitigation techniques may use a Network Listen Module (NLM) to detect surrounding macrocell channel quality and calibrate femtocell transmit power based on the detected channel quality. In general, the NLM includes receiver components that are configured to acquire forward link signals transmitted by nearby access points. However, these methods are generally based on simplistic assumptions regarding the coverage area and macrocell interference variation and, as a result, may not provide a desired level of coverage. Thus, there is a need for improved RF coverage control for wireless networks.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to controlling transmit power for a network of femtocells. In a typical implementation, the femtocells are deployed in an enterprise environment (e.g., within a building) or in a residence.

The disclosure relates in some aspects to a power calibration scheme that adjusts power levels of femtocells based on macrocell signals seen at different points in and around a coverage area and based on the mutual positions of the femtocells (e.g., based on femtocell signals seen at these points). In this way, the power calibration scheme facilitates a good balance between providing a desired level of coverage and mitigation of interference to nearby macrocells and femtocells. Such a power calibration scheme may be used to control femtocell service channel (hereafter referred to as the femtocell forward link (FL)) transmit power and/or femtocell beacon channel transmit power.

The disclosure relates in some aspects to a multi-stage calibration procedure. This multi-stage procedure involves two or more of: an initialization stage, a power adjustment stage, and a power optimization stage.

In some aspects, during an initialization stage, power levels for the femtocells are set through the use of a network listen procedure. Initially, each femtocell that belongs to a network (e.g., a group or cluster) of femtocells listens for macrocell signals and determines a maximum transmit power based on these signals. In an attempt to provide similar coverage areas for the femtocells, each femtocell may then be assigned substantially the same transmit power level (e.g., the same or within a defined delta). In some cases, the assigned transmit power level corresponds to the highest maximum power level that was determined by any of the femtocells in the femto network during the network listen procedure. Accordingly, in some aspects, a power control scheme comprises: receiving transmit power values that were determined by a plurality of femtocells based on monitoring of macrocell signals; determining at least one transmit power value for the femtocells based on the received transmit power values; and configuring at least one of the femtocells to use the determined at least one transmit power value.

In some aspects, during a power adjustment stage, the transmit power for each femtocell is determined during a walk-based test procedure where each femtocell receives measurement reports from a specific access terminal (e.g., mobile device) that is moved through the coverage areas of the femtocells (e.g., a technician carrying a cell phone walks through the building). These measurement reports include, for example, indications of received signal strength or signal quality as seen at various locations by the access terminal for signals received from the femtocells and any nearby macrocells. Accordingly, in some aspects, a power control scheme comprises: sending at least one request for measurement reports to a specified access terminal; receiving the requested measurement reports at a femtocell, wherein the measurement reports are associated with a plurality of locations of the specified access terminal; and controlling transmit power of the femtocell based on the received measurement reports, wherein the transmit power is controlled to meet at least one criterion (e.g., signal-to-noise-ratio (SNR) criterion, handover criterion, macrocell protection criterion, pilot signal quality criterion, adjacent channel protection criterion, etc.) at one or more of these locations.

In some aspects, the transmit power for each femtocell is adjusted based on received measurement reports to meet a specified criterion (e.g., SNR criterion or handover criterion) at each measurement reporting location where that femtocell induces the highest received femtocell signal quality. In some cases, a femtocell will filter the received measurement reports to eliminate any reports received from locations where that femtocell did not induce the highest received femtocell signal quality. Accordingly, in some aspects, a power control scheme comprises: receiving a plurality of measurement reports at a first femtocell; filtering the measurement reports to eliminate any measurement reports that identify another femtocell as being associated with a higher received signal quality than the first femtocell; and controlling transmit power of the first femtocell based on the filtered measurement reports.

In some aspects, during a power optimization stage, a decision to reconfigure the femtocells (e.g., change the femtocell locations or change the number of femtocells) is triggered based on information obtained as a result of an initial or a subsequent training walk-based calibration procedure performed for the femtocells. For example, an indication to reconfigure the femtocells may be generated upon determining that: 1) the power difference between femtocells is too large; 2) too many reports indicate a high path loss to femtocells; 3) femtocells are operating at maximum power; or 4) a coverage hole exists. Accordingly, in some aspects, a power control scheme comprises: receiving information obtained as a result of a training walk calibration procedure performed for a plurality of femtocells; identifying a reconfiguration triggering condition based on the received information; and generating an indication to reconfigure the femtocells as a result of the identification of the reconfiguration triggering condition.

The power calibration scheme may be employed in a decentralized (e.g., distributed) deployment or in a centralized deployment. As an example of a decentralized deployment, each femtocell of a network of femtocells may acquire measurement reports and calibrate its transmit power independently of the power calibration of the other femtocells of the network (e.g., with little or no coordination with the other femtocells). As an example of a centralized deployment, an entity (e.g., a designated one of the femtocells or network entity such as a base station controller (BSC), etc.) obtains measurement reports acquired by the network femtocells and calibrates the transmit power of the femtocells accordingly.

BRIEF DESCRIPTION OF THE DRAWINGS

These and other sample aspects of the disclosure will be described in the detailed description and the claims that follow, and in the accompanying drawings, wherein:

Figure 1:
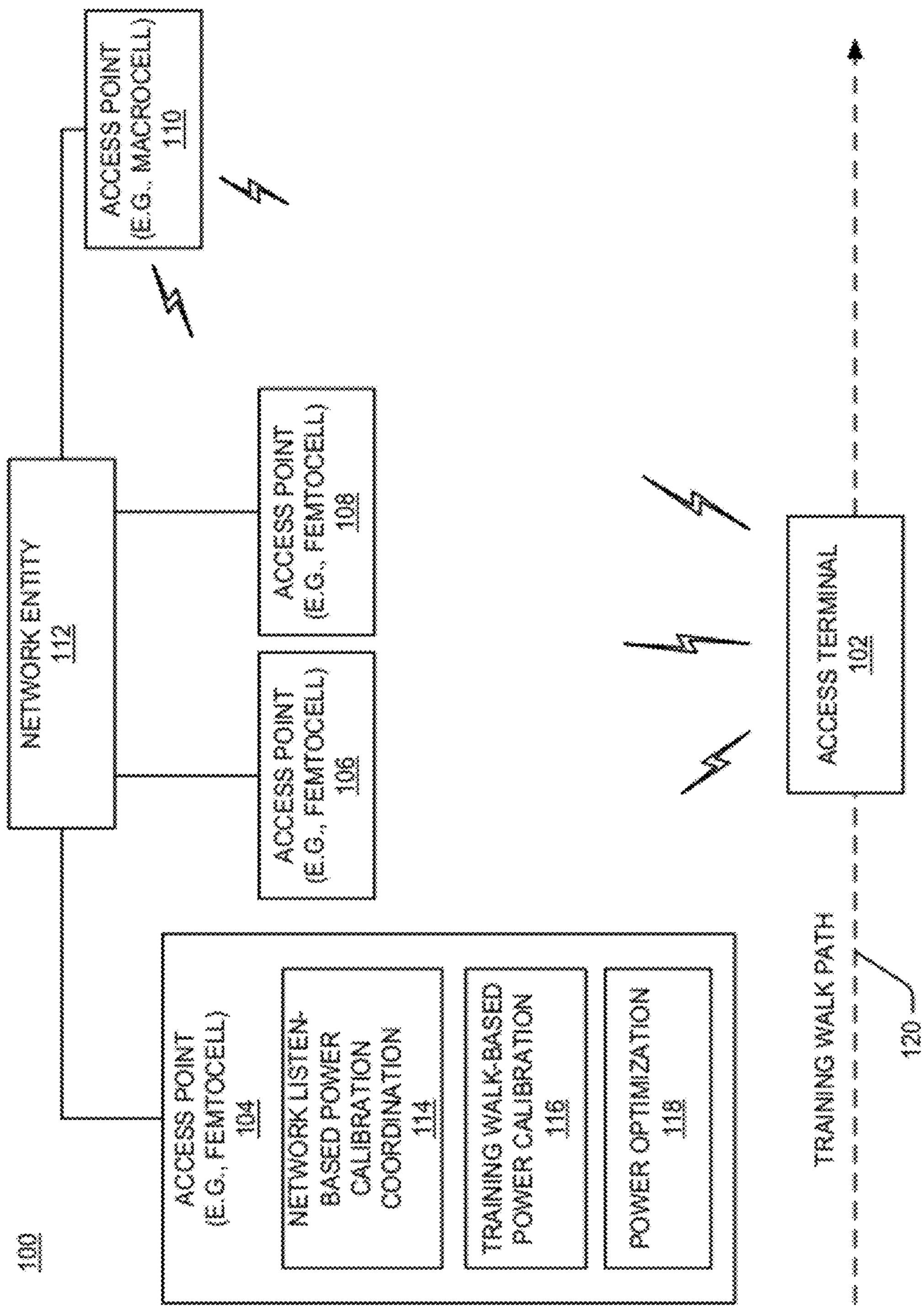
FIG. 1 is a simplified block diagram of several sample aspects of an embodiment of a communication system configured to control access point transmit power.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, femtocells, Home NodeBs, Home eNodeBs, and so on, while access terminals may be referred to or implemented as user equipment (UEs), mobile stations, and so on.

Access points in the system 100 provide access to one or more services (e.g., network connectivity) for one or more wireless terminals (e.g., an access terminal 102) that may be installed within or that may roam throughout a coverage area of the system 100. For example, at various points in time the access terminal 102 may connect to an access point 104, an access point 106, an access point 108, an access point 110, or some access point in the system 100 (not shown). Each of these access points may communicate with one or more network entities (represented, for convenience, by a network entity 112) to facilitate wide area network connectivity.

The network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals. Also, two or more of these network entities may be co-located and/or two or more of these network entities may be distributed throughout a network.

A power control scheme as taught herein is used to control the transmit power of the access points 104-108. In a typical implementation, the access points 104-108 are femtocells.

At least one of the entities of FIG. 1 includes functionality for network listen-based power calibration coordination 114, training walk-based power calibration 116, and power optimization 118. To reduce the complexity of FIG. 1, this functionality is depicted only for the access point 104 (e.g., a designated cluster head of a cluster of femtocells). In practice, at least some of this functionality (e.g., conducting network listen measurements and receiving measurement reports from the access terminal 102) is performed in each of the access points 104-108. The rest of the functionality (e.g., computing transmit power values based on information collected by the access points 104-108) may be implemented in a distributed manner by the access points 104-108 or implemented by a single entity such as a designated one of the access points 104-108 (e.g., a designated head of a femtocell cluster) or a network entity. For example, in some implementations, this functionality is partially implemented in the network entity 112 (e.g., a BSC network entity deployed by a network operator) and partially implemented in the access points 104-108. In other implementations, however, this functionality is implemented in a distributed manner entirely within each of the access points 104-108.

For purposes of illustration, this functionality will be described in the context of a femtocell coverage planning procedure that employs a training walk. This procedure involves, for example, determining the number and placement of femtocells to be deployed, determining an initial value of femtocell transmit power to be used during the training walk, calibrating femtocell transmit power based on the training walk, and performing transmit power optimization. This determination of transmit power values may be referred to as Supervised Mobile Assisted Range Tuning (SMART) herein.

Once the femtocells are deployed, the network listen-based power calibration coordination 114 determines the initial transmit power to be used by the femtocells based on macrocell signals. For example, each of the femtocells uses Network Listen Power Calibration (NLPC) to determine an initial transmit power value based on access point FL signals (e.g., macrocell signals and/or femtocell signals) received at that femtocell via the NLM. Each femtocell then sends the transmit power value it calculated to the power calibration coordination 114. The power calibration coordination 114 then determines the transmit power to be used by each of the femtocells during the training walk-based calibration procedure and sends the corresponding transmit power information to each of the femtocells. A training walk is then commenced whereby, as the access terminal 102 is move along a training walk path 120, the access terminal 102 sends measurement reports to the femtocells. Information from these measurement reports is then sent to the training walk-based power calibration 116, whereby the training walk-based power calibration 116 determines the transmit power to be used by the femtocells based on these measurement reports. The power optimization 118 is then used to determine whether to reconfigure the femtocells based on information determined by the training walk-based power calibration 116 (e.g., during an initial or subsequent training walk).

Sample operations that may be employed to provide SMART-based femtocell coverage planning for a building deployment will now be described in more detail in conjunction with the flowchart of FIG. 2. For convenience, the operations of FIG. 2 (or any other operations discussed or taught herein) may be described as being performed by specific components (e.g., components of FIG. 1 or 8). It should be appreciated, however, that these operations may be performed by other types of components and may be performed using a different number of components. It also should be appreciated that one or more of the operations described herein may not be employed in a given implementation.

As represented by block 202, the number of femtocells to be deployed is determined and the placement of those femtocells is determined. For example, a technician may select the number and placement of the femtocells based on the area and the shape of the area (e.g., house or enterprise building) to be covered, the material of the structure, and the RF scattering environment. In general, it is desired that a user be served by the femtocells once the user enters the building. In this way, a more consistent level of service may be provided (e.g., by avoiding macrocell call drops deep in the building) and, in some cases, additional services (e.g., higher bandwidth services) may provided. Accordingly, a typical design goal is that the collective coverage of the femtocells covers the entire interior of the building.

One or more guidelines may be employed at this stage of the procedure. One guideline is that femtocells are to be placed as uniformly as possible (e.g., throughout the enterprise). This helps to ensure that the coverage of each femtocell may be similar and symmetrical. This also helps to avoid forward link/reverse link (FL/RL) imbalance and unequal loading issues. Another guideline is to ensure that each femtocell does not have direct line of sight to the outside of the building (e.g., directly through a window). This will help to limit femtocell power leakage outside the building. Another guideline is to ensure that each femtocell is not too far from any edge and/or corners of the building. This will help to prevent the need for very high femtocell power setting to cover these locations.

The number of femtocells deployed depends, in part, on the forward link coverage provided by each femtocell. For example, in some implementations each femtocell may have a practical maximum transmit power limit of 15 dBm. In some aspects, coverage is dictated by the femtocell FL or the femtocell beacon. For example, in a dedicated deployment (femtocell is on a different frequency that the macrocells), at a macrocell site, femtocell FL coverage in this case may be 90-95 dB while femtocell beacon coverage may be 70-75 dB. At a macrocell edge for a dedicated deployment in this case, femtocell FL coverage may be 110-115 dB while femtocell beacon coverage may be 95-100 dB. In a co-channel deployment (femtocell is on the same frequency as a macrocell), at a macrocell site in this case, femtocell FL coverage may be 80 dB. At a macrocell edge for a co-channel deployment in this case, femtocell FL coverage may be 105 dB. In a large enterprise deployment (e.g., an office building with walled offices), a guideline for femtocell coverage may be on the order of, for example, 7000 square feet.

Figure 3:
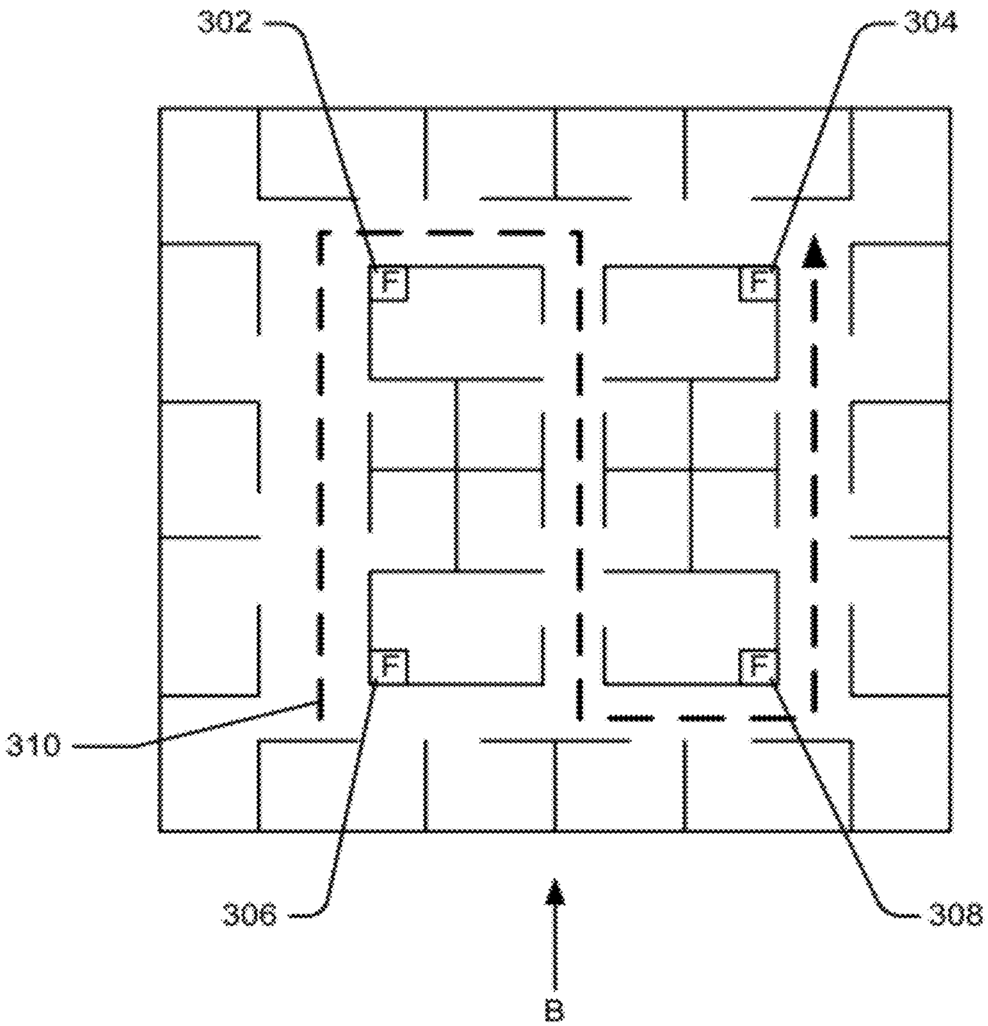
FIG. 3 is a simplified diagram of a sample training walk path.

FIG. 3 illustrates, in a simplified manner, an example of a deployment where four femtocells 302, 304, 306, and 308 are deployed in a building B. Here, it may be seen that the femtocells 302, 304, 306, and 308 are somewhat evenly spaced to have comparable coverage areas, provide adequate corner coverage, and are not in direct line of sight with the exterior (e.g., the femtocells 302, 304, 306, and 308 are placed in interior rooms).

Figure 2:
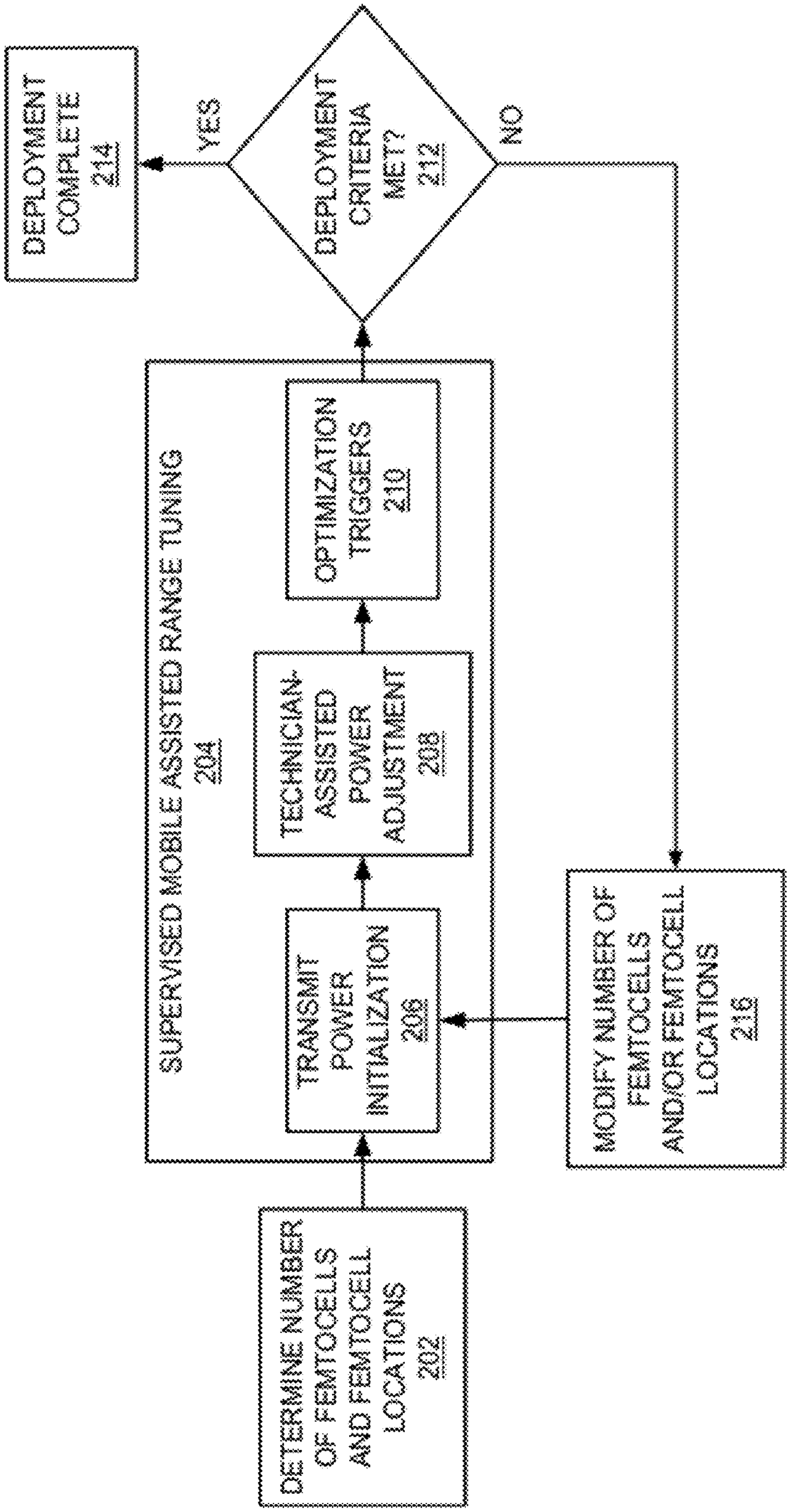
FIG. 2 is a flowchart illustrating several sample power control operations.

As represented by block 204 of FIG. 2, once the femtocells are deployed, the SMART procedure 204 is invoked. This involves a transmit power initialization operation, a technician assisted power adjustment operation, and optimization trigger operations, if applicable.

As represented by block 206, a transmit power initialization operation is performed. In a typical embodiment, all of the femtocells calibrate their initial power-up values using NLPC. For example, each femtocell may monitor for signals from macrocells and/or other femtocells and calculate its power value (e.g., a maximum power value) based on the received signals. The transmit power (e.g., maximum transmit power) for each femtocell may then be determined based on all of the values calculated for the different femtocells.

In general, it is desirable for all of the femtocells to use the same or a similar transmit power at this point. In some aspects, the goal here is to initialize all the femtocells to a similar power level, where that power level is high enough to collect measurement reports from the entire intended coverage region. If this is done, then during the training walk power adjustment procedure, all of the femtocells will have similar coverage areas. Consequently, each femtocell will therefore try to set its final power level to cover approximately the same area. In this way, substantially equal coverage areas for all of the femtocells may be achieved.

As mentioned above, the transmit power to be used by each of the femtocells during the training walk may be determined in a centralized manner (e.g., by a single entity) or in a distributed manner. In the former case, each femtocell uses the NLPC procedure to determine a transmit power value and reports that value to the entity. Based on these received values, the entity calculates the transmit power value(s) to be used by the femtocells. In the latter case, each femtocell reports its NLPC calculated power value to each of the other femtocells. Thus, based on the values received by a given femtocell, that femtocell calculates the transmit power value that it will use during the training walk.

In some embodiments, the maximum of all of the reported values is calculated and all of the femtocells are initialized to this same value. For example, in a centralized embodiment, a single entity computes this maximum value and sends it to the femtocells. In a distributed embodiment, each femtocell computes this maximum value for itself. In this way, it may be guaranteed that all of the femtocells (even those subjected to high macrocell interference) may provide adequate coverage.

In some embodiments, a limit is placed on how much the initially calculated transmit power value for a given femtocell (e.g., the NLPC-based value) can be changed at this step. In this way, the interference to the macro network may be limited to some extent. In this case, however, the coverage areas of different femtocells may vary somewhat.

In general the maximum power available (e.g., based on hardware constraints) is not chosen as the maximum transmit power during the calibration stage. In this way, impact on the macro channel may be mitigated to some extent.

As represented by block 208 of FIG. 2, once all of the femtocells have their transmit powers initialized, a technician-assisted power adjustment is made. Here, all of the femtocells adjust their power based on the macro environment and the presence of other femtocells around them. To this end, an active call (e.g., a voice or data connection) is initiated on the femtocell channel and a training walk is carried out. Preferably, the path for the walk will comprehensively span the desired coverage area for all femtocells. This training walk may be carried out, for example, by a mobile phone user or a technician. (e.g., an IT technician, a network operator technician, etc.).

While it is feasible to collect femtocell users' measurement reports for calibrating transmit power levels, such an approach has the several shortcomings. For example, femtocell users may initiate a voice call and walk out of the desired coverage area. Thus, femtocells trying to adapt their coverage will likely cause their coverage regions to expand. As a result, the femtocells will eventually end up transmitting at the maximum allowed transmit power (e.g., 20 dBm) and cause interference to the macrocell network. As another example, femtocell user density or traffic may be skewed, thereby resulting in coverage holes in the coverage area. Accordingly, in accordance with the teachings herein, it is generally preferable to employ a well defined training path (e.g., via technician assistance) for calibrating femtocell transmit power.

FIG. 3 illustrates, in a simplified manner, an example of a training walk path represented by a dashed line 310. In general, this path traverses significant portions of the coverage areas of the four femtocells 302, 304, 306, and 308.

During the training walk, the femtocells request the active mobile to measure and report the signal quality of the femtocells and macrocells. This gives the serving femtocell an indication of the path loss at different points and the observed interference. Using this information, all femtocells adjust their transmit power in an attempt to achieve optimal transmit power levels. Several examples of the algorithms for calculating this transmit power are describe below. Beacons may or may not be transmitted during this stage depending on the technology (e.g. for CDMA 1xRTT, beacons may not be required; while for CDMA 1xEV-DO, beacons will typically be transmitted). This procedure may be repeated for further power tuning.

As represented by block 210, after the transmit power calibration operation, optimization triggers may be employed in an attempt to further optimize the femtocell location and transmit power values. This optimization may be based on, for example, one or more of: absolute transmit power levels, inter-femtocell transmit power differential, and the coverage area being served by each femtocell.

As represented by blocks 212 and 214, if the optimization criteria are met (e.g., no optimization triggers occur), the deployment is complete and the femtocells will use the transmit power values calculated during the transmit power calibration operation. In contrast, if the optimization criteria are met at block 212 (e.g., at least one optimization trigger occurs), an indication may be raised to inform the technician that the number and/or locations of the femtocells needs to be changed. In this case, once the femtocells are reconfigured as represented by block 216, the SMART procedure 204 is performed again for the new configuration. The above process is repeated as necessary until a satisfactory deployment is achieved.

Through the use of a coverage planning scheme as taught herein, several problems associated with multi-femtocell deployments (e.g., enterprise deployments) may be mitigated. These problems include, for example, large FL/RL imbalances, negative impact on macrocell RL, and negative impact on macrocell FL.

The macrocell signal strength at different locations in a large building may vary by a large amount (e.g., 20-30 dB) due to the distance and building structures between the macrocell and a given location (e.g., a location next to a window versus a location in the middle of the building). Moreover, power calibration based solely on a network listen approach may result in a large transmit power differential between adjacent femtocells that are located near a macrocell site. This, in turn, may lead to a large FL/RF imbalance. Here, a user may be served by a stronger, but further, femtocell on the DL such that the user will transmit at a relatively high power on the UL and cause significant interference at a weaker, but closer, femtocell.

In some aspects, coverage planning as taught herein may be employed to mitigate such imbalance. For example, a determination may be made that more femtocells are to be deployed, whereby each of these femtocells will have a smaller coverage area. This configuration, in turn, will help to limit transmit power differentials in the system.

Femtocell user impact on a macrocell RL is a function of the user's path loss difference to the macrocell and the femtocell, the femtocell noise figure (e.g., which is typically higher than the macrocell), and rise-over-thermal (RoT) at the femtocell (e.g. which may be very high due to an active nearby macrocell user). If the coverage area of the femtocell is large, femtocell users at the edge of femtocell coverage will transmit at a relatively high power. This, in combination with a smaller path loss differential that may occur at the femtocell edge, can result in RL interference at a nearby macrocell.

Again, coverage planning as taught herein may be employed to mitigate such interference. By deploying more femtocells with smaller coverage areas, the likelihood that a femtocell user will be transmitting at a very high power at a femtocell edge may be reduced.

Typically, wireless networks do not support macrocell to femtocell hand-in. As a result, if a femtocell has a large coverage area (e.g., to ensure coverage is provided at the corners of the building), there may be significant femtocell power leakage outside the building (e.g., through windows). This leakage, in turn, may interfere with active macrocell users in the vicinity of the building if the femtocell has closed access. Moreover, even with open femtocell access, in some implementations it is still desirable to contain the femtocell coverage within a building to avoid excessive reselections and handover to femtocells by passing-by macrocell users or to avoid call drops if active hand-in is not supported.

Coverage planning as taught herein may again be employed to mitigate such interference. By deploying more femtocells with smaller coverage areas, the likelihood that leakage will occur may be reduced. Moreover, layered beacons or opportunistic femtocell beacons may be employed to mitigate interference associated with the transmission of beacons by the femtocells in the building. Furthermore, coverage planning as taught herein may be relatively simple to execute and need not involve extensive planning or RF measurement campaigns that employ sophisticated equipment. Rather, based on information obtained with minor assistance from a technician (or other suitable person), transmit power for the femtocells may automatically adapt to the RF environment (e.g., via self-calibration) using either a distributed or centralized architecture.

With the above in mind, sample operations that may be performed to control transmit power of a plurality of femtocells will be described with reference to the flowcharts of FIGS. 4-7.

Figure 4:
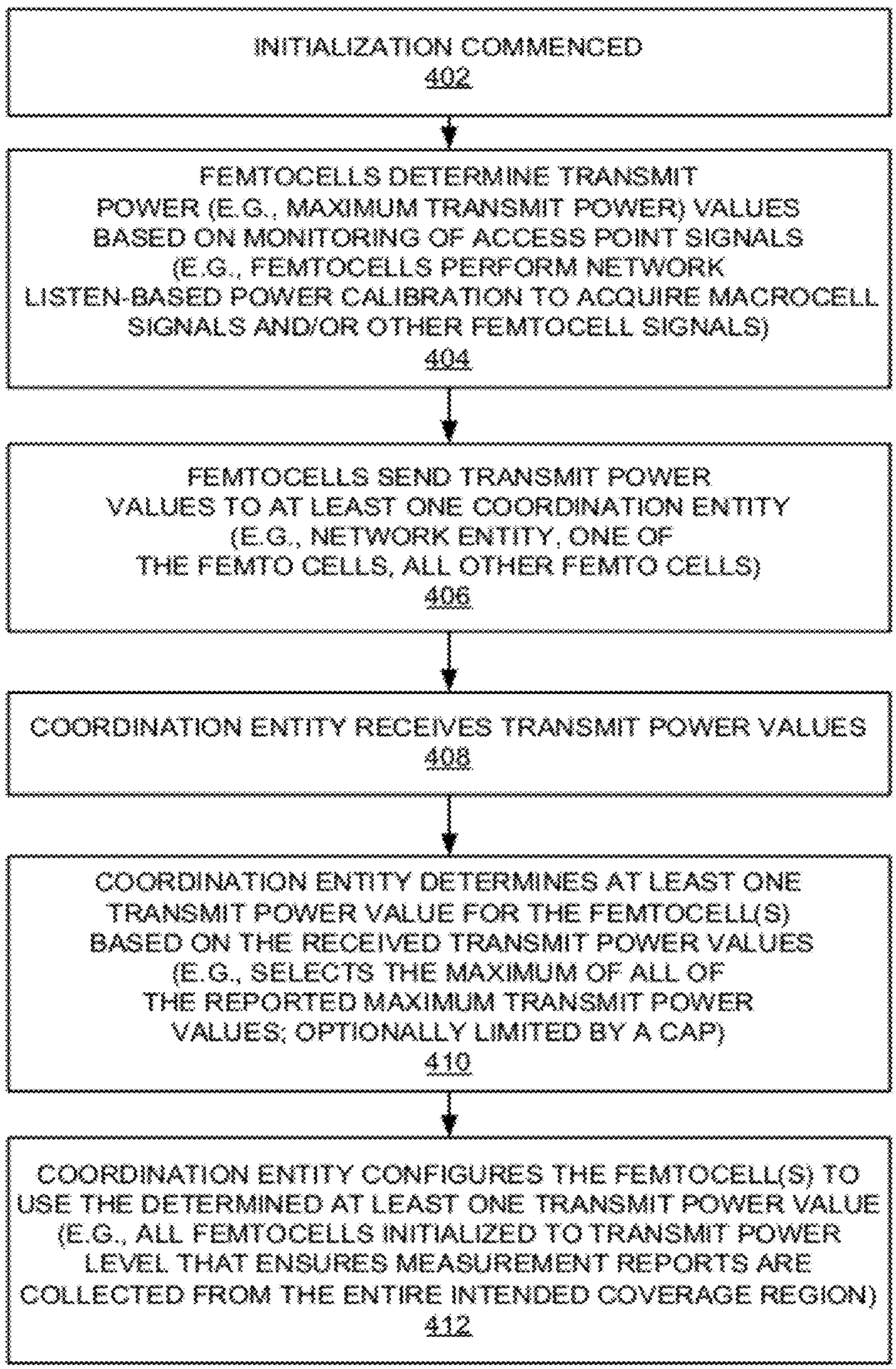
FIG. 4 is a flowchart illustrating several sample operations for initializing access point transmit power.

FIG. 4 illustrates sample operations for initializing the transmit power for each femtocell of a network of femtocells. Depending on the particular implementation this will involve setting femtocell DL transmit power and, optionally, femtocell beacon transmit power. As represented by block 402, the initialization commences after the femtocells are deployed.

As represented by block 404, each femtocell determines a transmit power value based on monitoring of access point signals (e.g., signals from macrocells and/or signals from other femtocells). For example, each femtocell may conduct an NLPC operation and calculate a maximum transmit power for that femtocell based on the received macrocell signals.

This transmit power value may be calculated based on one or more of various criteria. In some implementations, a maximum transmit power value is selected to provide adequate power to obtain active reports from all regions in the desired coverage area. In some implementations, a maximum transmit power value is selected to limit the impact on macrocell users during the training walk. In some implementations, a maximum transmit power value is selected to provide equal power for the femtocells to minimize FL/RL imbalance.

This transmit power value may be calculated based on various received signal information. In some implementations, one or more of the total received power on a channel (e.g., Io) and the received pilot energy on a channel (e.g., Ecp) are used to calculate the transmit power. Note that these quantities are measured by femtocell's NLM. In some implementations, the transmit power is set to meet a specified signal-to-noise ratio (SNR) at the edge of the femtocell coverage (e.g., as specified by a defined path loss). In this case, the transmit power may be calculated based on the measured Io due to the macrocells, the defined path loss, and the target SNR.

In some implementations, femtocell transmit power is chosen to satisfy a coverage condition where, for example, at the edge of the coverage range, the femtocell's pilot quality (e.g., common pilot channel quality such as CPICH $E_c$/Io in a UMTS system) is specified to be better than a defined threshold. In some cases (e.g., for UMTS), the threshold corresponds to a $Q_{qualmin,femto}$ parameter broadcast in a macrocell SIB 11 message. Furthermore, to limit interference to the macrocell network, the femtocell transmission is allowed to increase macrocell Io by at most a certain fixed amount at the edge of the femtocell coverage range. Femtocell transmit power is chosen to be the minimum of the two criteria. These procedures allow femtocell transmit power to be adapted based on the location in the macrocell networks. For example, the transmit power is generally set low in a location where the measured macrocell received signal strength (e.g., RSSI) is weak as compared to a location where the measured macrocell received signal strength is strong.

In some implementations, femtocell transmit power is chosen to satisfy a coverage condition and adjacent channel protection conditions. Here, one adjacent channel protection condition corresponds to the same wireless network operator that is associated with the femtocell being calibrated, while another adjacent channel protection condition corresponds to a different wireless network operator than the operator associated with the femtocell being calibrated.

As represented by blocks 406 and 408, each femtocell sends its calculated transmit power value to at least one coordination entity that performs the transmit power control operations of blocks 408-412. Depending on the particular implementation, these transmit power control operations may be performed at various types of entities in the system.

In some implementations, each femtocell receives the transmit power values for all of the other femtocells, and determines its transmit power based on the received transmit power values (e.g., by selecting the maximum value of all these values). In this case, each of the femtocells comprises a coordination entity that performs the operations of blocks 406-410.

In some implementations, one entity receives the transmit power values for all of the femtocells, determines the transmit power to be used based on the received transmit power values (e.g., by selecting the maximum value of all these values), and sends the determined transmit power value(s) to the femtocells. In this case, this centralized entity comprises the coordination entity that performs the operations of blocks 406-410. This entity may be, for example, one of the femtocells, a network entity (e.g., a BSC), or some other type of entity.

As represented by block 410, a coordination entity determines at least one transmit power value for at least one of the femtocells based on the received transmit power values. In a case where each of the femtocells comprises a coordination entity, a given femtocell determines its own transmit power. In a case where there is a centralized coordination entity, that entity determines the transmit power for each of the femtocells.

As mentioned above, in some cases, the same transmit power value is selected for all of the femtocells. For example, the maximum value may be selected from all of the received transmit power values and this value used by all of the femtocells.

Also as mentioned above, in some cases, the transmit power value selected for a given femtocell may be limited in some manner. For example, the maximum value of all of the received transmit power values may initially be selected. However, the power will be restricted so that it is not increased above the initial value calculated by that femtocell (e.g., the NLPC-based transmit power value) by more than a designated cap value. In this way, a limit may be placed on the amount of interference that is caused on the macro network during the training walk operation.

As represented by block 412, the coordination entity configures at least one femtocell to use the transmit power value(s) determined at block 410. In a case where each of the femtocells comprises a coordination entity, a given femtocell sets its transmit power based on the value it determined at block 410. In a case where there is a centralized coordination entity, that entity sends the determined value(s) to the femtocells. Here, if a single value was calculated at block 410, this value is sent to all femtocells. Conversely, if different values were calculated for different femtocells at block 410, the appropriate value is sent to each femtocell. Note that if the entity is one of the femtocells, this femtocell will set its transmit power based on the corresponding value it determined for itself and then send the appropriate value(s) to the other femtocells.

Figure 5:
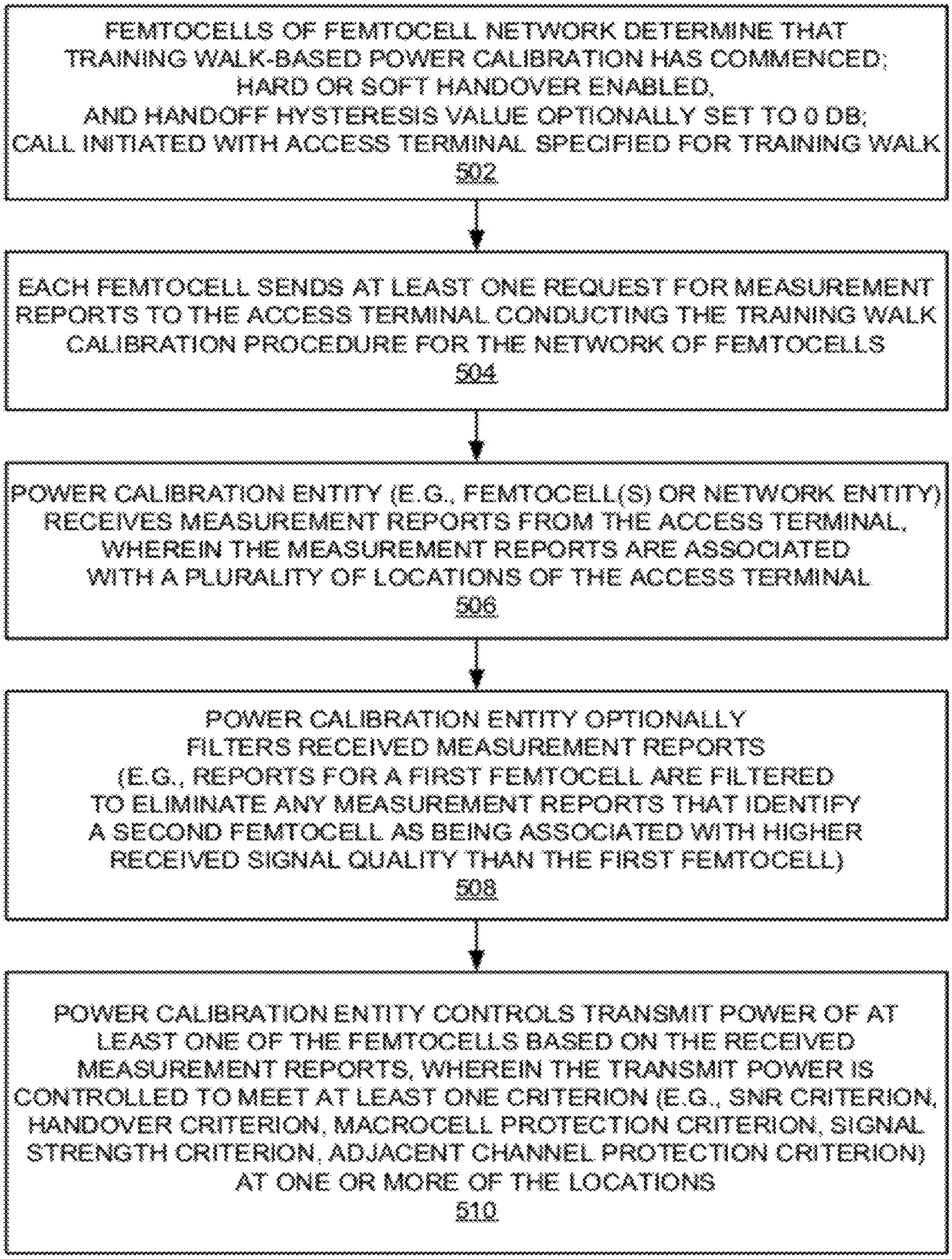
FIG. 5 is a flowchart illustrating several sample operations for controlling access point transmit power in conjunction with a training walk.

FIG. 5 illustrates sample training walk-based transmit power calibration operations for a network of femtocells. As represented by block 502, the initialization commences after the femtocells have their initial transmit power set.

Here, the handover parameters may be set to a different value than the values used during normal operations. For example, in some implementations, a femtocell that is serving the user sets its handover hysteresis parameter (e.g. "Hyst") to a value of 0 dB and sends an indication of this changed value to the access terminal used by the technician (e.g., via a message that enables hard handover). In some implementations (e.g., UMTS femtocells), a femtocell that is serving the user sets a handover hysteresis parameter minus cellular regional offset (CIO) to a value of 0 dB and sends an indication of this change in value to the access terminal used by the technician (e.g., via a message that enables handover). In either of these cases, once the access terminal receives stronger signals from another one of the femtocells, the access terminal will be handed-over to that other femtocell (e.g., where this handover operation uses the handover parameter(s) and is controlled by the current serving femtocell based on the measurement reports the serving femtocell receives from the access terminal). This stands in contrast to a normal operating mode where handover would not occur until the measured signal strength of the other femtocell exceeded the measured signal strength of the current serving femtocell by some margin (i.e., as defined by a non-zero handover hysteresis parameter). By controlling the hysteresis parameter in this way, the access terminal will send its measurement reports to the closest femtocell. Thus, each femtocell will more readily collect all of the measurement reports for the coverage area that will likely be ultimately covered by that femtocell.

Thus, in some aspects, handover operations at a femtocell may involve defining a first handover hysteresis value for handover decisions during the training walk calibration procedure and defining a second handover hysteresis value for handover decisions after the training walk calibration procedure is completed (e.g., during normal, non-initialization operations), wherein the second handover hysteresis value is different from (e.g., higher than) the first handover hysteresis value. Here, the first handover hysteresis value may be defined such that during the training walk calibration procedure the access terminal will send each measurement report to a femtocell that is associated with a strongest received signal value in the measurement report. For example, in some cases, the first handover hysteresis value (e.g., "Hyst" or "Hyst-CIO") is approximately 0.

The training walk commences with the technician establishing an active call (e.g., voice or data) with one of the femtocells. This may involve, for example, the technician invoking a specified application on the access terminal and/or on the femtocell (e.g., by actuating a user input device). Thus, a specified access terminal is identified for conducting the training walk operation. The technician carries this access terminal over a route that preferably encompasses the defined coverage area in a comprehensive manner, without leaving the coverage area (e.g., to avoid generating an unnecessarily large coverage area).

As represented by block 504, the femtocell that is currently serving the access terminal sends at least one request for measurement reports to the specified access terminal. This request may originate at the femtocell or at some other entity (e.g., when soft handover is supported, an entity that controls the soft handover signaling will originate this request and send it to the access terminal vie the serving femtocell). In some implementations, the femtocell sends a single message that requests the access terminal to send periodic measurement report messages. In some implementations, the femtocell repeatedly sends messages, each of which requests the access terminal to send a periodic measurement report message. Also, the request may specify that measurements are to be conducted on the same frequency and/or on at least one other frequency (e.g., adjacent channels). In this way, the femtocell transmit power may be calibrated for that same frequency and/or at least one other frequency. Furthermore, for an implementation that supports multiple wireless technologies (e.g., 1xRTT, 1xEV-DO, UMTS, etc.), information from measurement reports from one wireless technology may be used to control transmit power for a different wireless technology.

As represented by block 506, the entity that controls the femtocell power calibration (e.g., the femtocell, a network entity, etc.) receives the requested measurement reports from the access terminal. Since the access terminal was moving along the training path, different measurement reports will be associated with different locations of the access terminal within the coverage area.

The type of information provided by each measurement report depends on the wireless technology employed by the system. For example, in a 1xRTT system, pilot strength measurements messages (PSMMs) and candidate frequency search report messages (CFRs) may provide Ecp/Io and Io information for femtocell and beacon frequencies. From this information (and the known transmit power of the femtocell), the path loss from the femtocell to the location where a given measurement was taken may be calculated. As another example, in a 1xEV-DO system, route update messages (RUMs) may provide Ecp/Io information for femtocell and beacon frequencies. As yet another example, in a UMTS system, measurement report messages (MRMs) may provide CPICH RSCP and Io information for femtocell and beacon frequencies.

As represented by block 508, the power calibration entity optionally filters the received measurement reports. For example, in cases where the femtocell receives measurement reports from other access terminals during the training walk operation, the femtocell may filter out these other measurement reports (e.g., based on identifiers of the access terminals that provided the reports that are included in the reports).

As another example, the femtocell may eliminate any measurement reports that were not from an intended coverage region. In this way, a given femtocell may be prevented from trying to cover an unnecessarily large coverage area. For example, since access terminal handovers may not occur immediately when a higher received signal strength from a different femtocell is observed at the access terminal, the current serving femtocell may receive measurement reports that list some other femtocell as having a higher received signal strength. However, it is not necessary for the current serving access point to try to cover these locations since they will be covered by the other femtocell.

Accordingly, in this case, the femtocell can filter the received measurement reports to eliminate any measurement reports that identify another femtocell as being associated with a stronger received signal quality than the current serving femtocell. For example, the serving femtocell may only retain the measurement reports for those locations where the serving femtocell is reported as providing the highest received signal strength.

As represented by block 510, the power calibration entity controls the transmit power (e.g., sets a maximum transmit power value) for a femtocell based on the received measurement reports (filtered, if applicable). Here, the transmit power is controlled to meet at least one specified criterion at one or more of the locations from which the measurement reports were made. Several examples of such criteria and the manner in which transmit power is controlled based on these criteria follow. For purposes of illustration, it is assumed that the femtocell calculates its own transmit power in these examples.

1xRTT Example:

In a 1xRTT dedicated channel implementation, beacon power on a macrocell frequency may be set to ensure that adequate beacon coverage is provided at each location of a set of locations within the desired coverage area (e.g., at most or all of the points from which this femtocell received a measurement report). For example, for each location, the femtocell calculates the transmit power needed to ensure a target coverage (e.g., an SNR such as a pilot power to total power ratio (e.g., Ecp/Io) for the beacon) is met at that location in view of the path loss to that location, the strength of the strongest macrocell pilot (e.g., Ecp) seen at that location, and a defined hysteresis threshold. In other words, for each location, the required power to perform beacon discovery (idle hand-in) is calculated by ensuring that the beacon pilot power at that location is greater than the macrocell pilot power at that location plus the hysteresis value.

In some implementations, outliers are eliminated from consideration here. For example, it may be predetermined that coverage will be provided for only 80% of the locations. The transmit power for the femtocell beacon is then selected as the transmit power that ensures beacon coverage at all of the locations of interest (e.g., to ensure beacon discovery at 80% of the reporting points). In this way, the femtocell will not select too high of a transmit power level which it may otherwise do if it was allowed to provide beacon coverage for every location from which a measurement report was received.

As mentioned above, a layered beacon approach is employed in some implementations. For example, a high power beacon may be transmitted some of the time (e.g., 5% of the time) and lower power beacon may be transmitted the rest of the time. In such a case, transmit power values are determined for the high and low power beacons. For example, the transmit power for the high power beacon may be selected as the transmit power that ensures beacon discovery at 80% of the locations, while the transmit power for the low power beacon may be selected as the transmit power that ensures beacon discovery at 50% of the locations.

In a 1xRTT dedicated channel implementation, femtocell FL power on the femtocell frequency may be set based on an SNR constraint and a macrocell protection constraint. That is, a first transmit power is calculated that meets the SNR constraint (e.g., to ensure good coverage at all points of interest) and a second transmit power is calculated that meets the macrocell protection constraint (e.g., to restrict impact on adjacent channel macrocell users at all points of interest). The minimum or a weighted combination (e.g. average) of these constraints is then selected for the femtocell FL transmit power.

For the SNR constraint calculation, for each location corresponding to the measurement reports, the femtocell determines the transmit power needed to ensure a target coverage (e.g., a SNR such pilot energy over noise plus interference (e.g., Ecp/Nt)) is met at that location in view of the path loss to that location and the total macrocell interference (e.g., Io) seen at that location. In other words, for each location, the required power to provide a specified Ecp/Nt (e.g., −7 dB) is determined. Here, the path loss information and the total macrocell interference information are obtained from the measurement report. Again, outliers are typically eliminated from consideration here. The first transmit power value for the femtocell FL is thus selected as the transmit power that ensures FL coverage at all of the locations of interest (e.g., the power required to cover 95% of the locations).

For the macrocell protection constraint calculation, the femtocell determines the maximum allowed transmit power that will prevent excessive interference on an adjacent macrocell frequency. For example, for each location corresponding to the measurement reports, the femtocell calculates the maximum transmit power that ensures that the femtocell FL signal interference at that location is at least a safety margin below the macrocell signal strength (e.g., Io) at that location, in view of the path loss to that location and the adjacent channel interference ratio (ACIR). In other words, for each location, the maximum allowed transmit power to limit impact to an adjacent channel macrocell signal to at most a defined value (e.g., 1.78 dB) is determined. Again, outliers are typically eliminated from consideration here. The second transmit power value for the femtocell FL is thus selected as the transmit power that ensures adequate protection at all of the locations of interest (e.g., the power required to protect 50% (e.g., >10 meter radius) of the locations).

As mentioned above, the final transmit power for the femtocell FL is then selected as the minimum of the first transmit power value and the second transmit power value or as a weighted combination of the two.

In a 1xRTT co-channel implementation, beacon power on a macrocell frequency may be set based on the same formula that was used for the dedicated channel implementations. In this case, however, an upper limit of the beacon power may be set based on the femtocell FL transmit power calculated for the co-channel implementation. For example, the femtocell beacon power may be kept lower than the femtocell FL power so that a user directed to the femtocell frequency by the femtocell beacon will see a strong enough femtocell FL signal to cause reselection to the femtocell.

In a 1xRTT co-channel implementation, the femtocell signal provides coverage to users and triggers macrocell users to reselect to the femtocell. In some aspects, the femtocell FL transmit power is set to provide adequate coverage while being conservative to prevent leakage. The femtocell FL power on the femtocell frequency may be based on an SNR constraint and an idle handover (e.g., hand-out) constraint. That is, a first transmit power is calculated that meets the SNR constraint and a second transmit power is calculated that meets the idle handover constraint. The maximum (or a weighted combination) of these constraints is then selected for the femtocell FL transmit power.

For the SNR constraint calculation, for each measurement report location, the femtocell determines the transmit power needed to ensure a target coverage (e.g., a SNR such as Ecp/Nt) is met at that location in view of the path loss to that location and the total macrocell interference (e.g., Io) seen at that location. Thus, a first set of transmit power values corresponding to each of the locations is provided at this stage of the process.

For the handover constraint calculation, for each measurement report location, the femtocell determines the transmit power needed to ensure that an access terminal at that location that is being served by the femtocell will not be handed-off to the macro network). Thus, for each location, the femtocell determines the transmit power needed to ensure that the femtocell pilot strength at that point exceeds the best macrocell signal strength (e.g., Ecp) at that location by at least a defined threshold (e.g., a hysteresis value), in view of the path loss to that location. At this stage of the process, a second set of transmit power values corresponding to each of the locations is provided.

Next, the maximum transmit power for each location is selected. That is, for each location, the highest transmit power is selected based on the corresponding values in the first set and the second set. Outliers are then typically eliminated from consideration. The final transmit power value for the femtocell FL is thus selected as the transmit power that ensures FL coverage at all of the locations of interest (e.g., the power required to cover 95% of the locations).

1xEV-DO Example:

Operations similar to those describe above may be employed for a 1xEV-DO implementation.

For a co-channel 1xEV-DO implementation, femtocell FL power on the femtocell frequency may be set based on an SNR constraint and a handover (e.g., handoff) constraint. In this case, since Io information is generally not available in a 1xEV-DO scenario, the SNR constraint and macrocell protection constraint algorithms are based on Ecp/Io from all macrocells and based on Ecp/Io of beacon signals as observed at each location. As above, outliers are typically eliminated from consideration (e.g., $95^{th}$ percentile), and the maximum of a first transmit power calculated to meet the SNR constraint and a second transmit power calculated to meet the handover constraint is selected as the final femtocell FL transmit power. Also, the calculated transmit power values may comprise incremental values (e.g., relative to the transmit power value set after initialization, e.g., as described at FIG. 4).

For a co-channel 1xEV-DO implementation, femtocell beacon power on an adjacent macrocell frequency may be set relative to the 1xEV-DO femtocell FL transmit power discussed above. This calculation is also based on Ecp/Io of the best macrocell on the femtocell frequency and based on Ecp/Io of the best macrocell on the adjacent macrocell frequency as observed at that location, as well as a defined fade margin.

For a dedicated channel 1xEV-DO implementation, femtocell FL power on the femtocell frequency may be set based on an SNR constraint and a macrocell protection constraint. In this case, different algorithms may be employed depending on whether adjacent channel interference is above a threshold level (e.g., the location is near a macrocell site). Also, since Io information may not be available in a 1xEV-DO scenario, the SNR constraint and macrocell protection constraint algorithms are based on Ecp/Io from all macrocells and based on Ecp/Io of beacon signals as observed at each location. As above, outliers are typically eliminated from consideration (e.g., $95^{th}$ percentile), and the minimum of a first transmit power calculated to meet the SNR constraint and a second transmit power calculated to meet the macrocell protection constraint is selected as the final femtocell FL transmit power.

For a dedicated channel 1xEV-DO implementation, femtocell beacon power on an adjacent macrocell frequency may be set to facilitate handover (e.g., idle mobile hand-in). For example, for each measurement report location, the femtocell may set the beacon transmit power to ensure that the beacon strength is higher than the strength of the strongest macrocell by a hysteresis margin. This calculation is based on Ecp/Io from all macrocells and based on Ecp/Io of beacon signals as observed at that location, as well as the defined hysteresis value. Again, outliers are typically eliminated from consideration at this point (e.g., $80^{th}$ percentile).

UMTS Example:

In UMTS, the measurement report message (MRM) contains CPICH RSCP and CPICH Ec/Io of the primary scrambling codes (PSCs) that were specified in the measurement control message (MCM) that requested the MRM. Using the MRMs, femtocells extract the path loss (PL) to the locations covered by the technician walk as well as the macrocell Io at those locations. Thus, femtocells (or other power control entities) can obtain estimates of required coverage range and RF conditions of adjacent channels and fine tune the femtocell transmit power accordingly.

Figure 8:
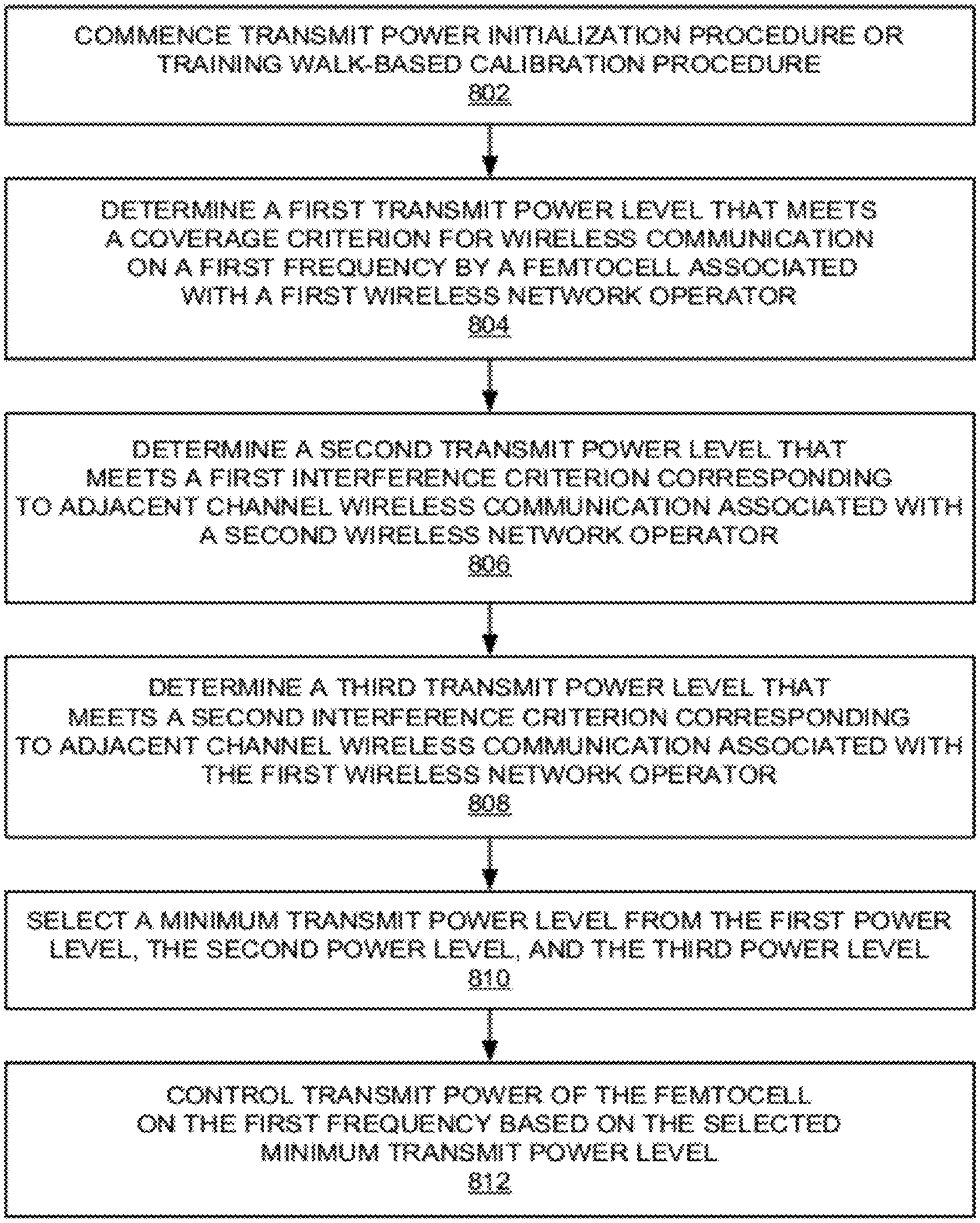
FIG. 8 is a flowchart illustrating several sample operations for controlling transmit power based on coverage and interference criteria.

FIG. 8 illustrates sample power calibration operations that may be performed for each femtocell commencing at block 802. In general, these operations may be employed for various types of transmit power calibration procedures. For example, such a scheme may be employed for a training walk-based calibration procedure, network listen-based power calibration (e.g., as described at FIG. 4 above), or for other types of calibration operations.

As represented by block 804, a determination is made regarding a first transmit power level that meets a coverage criterion for wireless communication on a first frequency by a femtocell associated with a first wireless network operator. For each location associated with a different MRM, the femtocell calculates the transmit power needed to ensure a target coverage (e.g., an SNR such as CPICH Ecp/Io) is met at that location in view of the path loss to that location, the macrocell RSSI (e.g., Io) seen at that location. In some implementations, outliers are eliminated from consideration here. For example, it may be predetermined that coverage will be provided for only a certain percentage of the locations. The first transmit power level is thus selected as the transmit power that ensures coverage at all of the locations of interest.

As represented by block 806, a determination is made regarding a second transmit power level that meets a first interference criterion corresponding to adjacent channel wireless communication with a second wireless network operator (other operator). In some implementations this criterion is based on a comparison of a value of signal power on the adjacent channel (e.g., CPICH Ec) with a value of total received power (e.g., Io, excluding the femtocell). Based on this comparison, a maximum transmit power value may be calculated according to a defined equation.

As represented by block 808, a determination is made regarding a third transmit power level that meets a second interference criterion corresponding to adjacent channel wireless communication with the first wireless network operator (same operator). In some implementations this criterion is based on a comparison of a value of signal power on the adjacent channel (e.g., CPICH RSCP) with a threshold. Based on this comparison, a maximum transmit power value may be calculated according to a defined equation.

As represented by block 810, the minimum of the first transmit power level, the second transmit power level, and the third transmit power level is selected. As represented by block 812, the transmit power of the femtocell is controlled based on the selected minimum transmit power level. In this way, the selected transmit power level provides as good of coverage as possible while still meeting the desired adjacent channel interference goals.

The above operations are performed at each femtocell in the network of femtocells. When the access terminal moves from the coverage from one femtocell to another, the other femtocell will commence communication with the access terminal. Thus, the new femtocell will commence sending requests for measurement reports to the access terminal (block 504), and will process received measurement reports to control its transmit power (blocks 506-510). The operations of blocks 504-510 will be repeated at each femtocell in the network of femtocells as the technician walks along the designated training path. In this way, all of the femtocells will compute a transmit power level that provides an effective compromise for that particular femtocell between adequate coverage versus adequate macrocell protection.

When the technician completes the training walk, the active call is terminated. This may involve, for example, the technician terminating a specified application on the access terminal and/or on the femtocell (e.g., by actuating a user input device).

Figure 6:
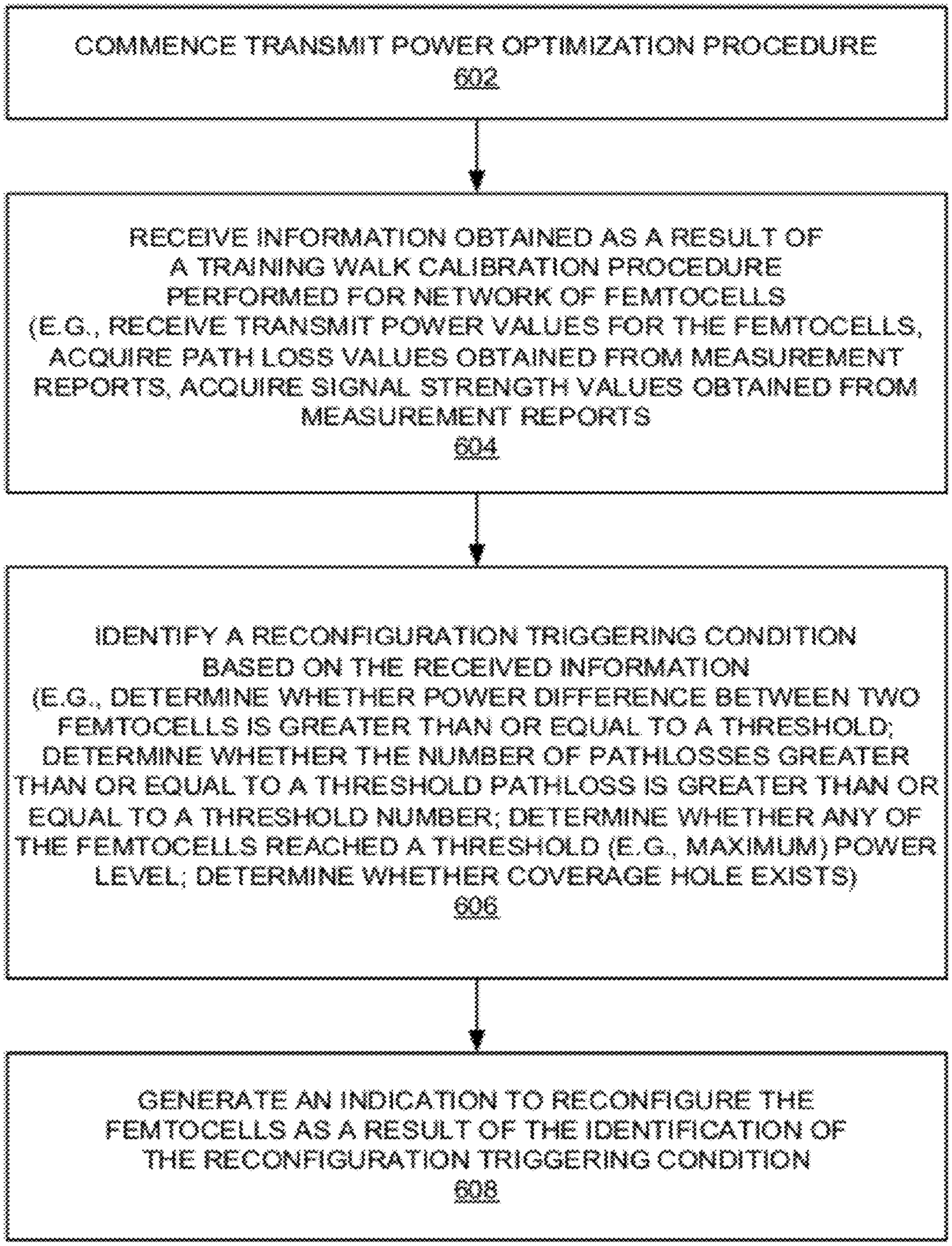
FIG. 6 is a flowchart illustrating several sample access point transmit power optimization operations.

FIG. 6 illustrates sample operations that may be employed in conjunction with an optimization procedure. This procedure may be performed by a designated one of the femtocells, by a network entity (e.g., a BSC), or by some other suitable entity that is able to acquire the transmit power information generated during the training walk-based calibration procedure.

As represented by block 602, the optimization procedure commences once the training walk-based calibration procedure is completed. At this stage of the process, a transmit power value has been calculated for each femtocell of the network of femtocells.

As represented by block 604, information obtained as a result of the training walk calibration procedure is received. For example, upon completion of the training walk-based calibration procedure, this information may be automatically sent to the entity that performs the optimization procedure (e.g., in implementations where a single entity is not performing both operations). In some implementations, this information comprises the transmit power values calculated for the femtocells during the training walk-based calibration procedure. In some implementations, this information comprises one or more of path loss values, signal strength values (e.g., pilot strength), or signal quality indications, which are obtained from the measurement reports that were received during the training walk calibration procedure, As represented by block 606, a reconfiguration triggering condition is identified based on the received information. For example, an optimization trigger may be set based on: power difference, serving path loss, power capping, coverage hole, or some other criterion.

In some implementations, a determination is made at this stage as to whether the difference between the transmit power values for two femtocells (e.g., adjacent femtocells) is greater than or equal to a threshold (e.g., 10 dB). In the event this power difference is exceeded, a reconfiguration of the femtocells (e.g., adding more femtocells) may be triggered to eliminate FL/RL mismatch that may occur as a result of this power differential.

In some implementations, a determination is made at this stage as to whether the number of path loss values greater than or equal to a threshold path loss is greater than or equal to a threshold number. As a specific example, a system may have a requirement that the path loss values should be less than 85 dB for at least 95% of the measurement reports. In this way, the system may limit the size of the coverage areas for the femtocells. Thus, a reconfiguration may be triggered upon determining that too many path loss values are too large.

A determination also may be made at this stage as to whether any of the femtocells reached a threshold (e.g., maximum) power level. As a specific example, a system may have a requirement that none of the femtocells should be allowed to operate at their maximum allowed power. For example, this criterion may be employed to limit the size of the coverage areas for the femtocells. Thus, a reconfiguration may be triggered upon determining that one or more of the transmit power values reached a threshold power level.

The technician also may perform a post-calibration walk to ensure satisfactory femtocell FL and femtocell beacon performance. For example, a determination may be made at this stage as to whether any coverage holes exist in the coverage area of the network of femtocells. Coverage holes may be identified in some cases by determining whether call drops occur in a certain area. If so, the technician may move the femtocells or insert more femtocells to eliminate these coverage holes.

In some implementations, a technician identifies coverage holes during a training walk by listening to an audio feed on the access terminal. For example, the technician may place a call with another access terminal or a server that provides an audio feed (e.g., a continuous audio track). The technician may then monitor the audio feed for call drops or noise (e.g., clicks and pops) and make a record of the locations at which these events occurred. Upon identifying these coverage holes, the technician may reconfigure the femtocells to eliminate the coverage holes.

In some implementations, coverage holes are identified by monitoring signal quality (e.g., pilot signal strength) throughout the training walk. This monitoring may be performed by the technician, by the access terminal, by a femtocell, by a network entity, or some other suitable entity that can receive this signal quality information. For example, the access terminal may output signal quality information acquired from its measurement reports on a user interface device (e.g., a display). The technician may then make a record of the locations at which the signal quality information fell below a threshold value to identify coverage holes. As another example, the access terminal may automatically compare the signal quality information it collects with one or more thresholds and trigger a reconfiguration if applicable (e.g., if the received signal quality is below a threshold for a certain percentage of a region). As yet another example, an entity (e.g., a femtocell, a network entity, etc.) may automatically compare the signal quality information it receives via measurement reports with one or more thresholds and trigger a reconfiguration if applicable.

As represented by block 608, an indication to reconfigure the femtocells will be generated as a result of the identification of a reconfiguration condition at block 606. For example, the entity that performs the optimization operation may output an indication on a user interface device or this entity may send a message to some other entity to cause an indication to be output on that entity (e.g., a femtocell, an access terminal, a network entity, a management tool, a web-based application, and so on). Upon receiving this indication, the technician may rearrange the femtocells and/or add another femtocell.

The technician may repeat the transmit power calibration procedure. For example, a subsequent training walk may be performed after the transmit powers are computed during an initial training walk and/or after reconfiguration of the femtocells. During this subsequent training walk, the information described above (e.g., power values, path loss values, etc.) may be acquired and used for transmit power optimization as discussed herein.

In the event the power differential exceeded the designated limit (e.g., 10 dB), the transmit power of the lower power femtocell may be increased to be within the limit. This operation may be performed in some cases without technician intervention. For example, the entity that performs the optimization operation may send a message to the appropriate femtocell to instruct that femtocell to adjust its transmit power (or the entity will invoke an internal operation if the entity is the femtocell that needs its power adjusted).

In situations where an access terminal is relative close to an access point (e.g., a femtocell), the access terminal may not be able to obtain reliable measurement report information from another access point. In this case, the FL transmissions by the nearby access point may overwhelm the receiver of the access terminal.

Figure 7:
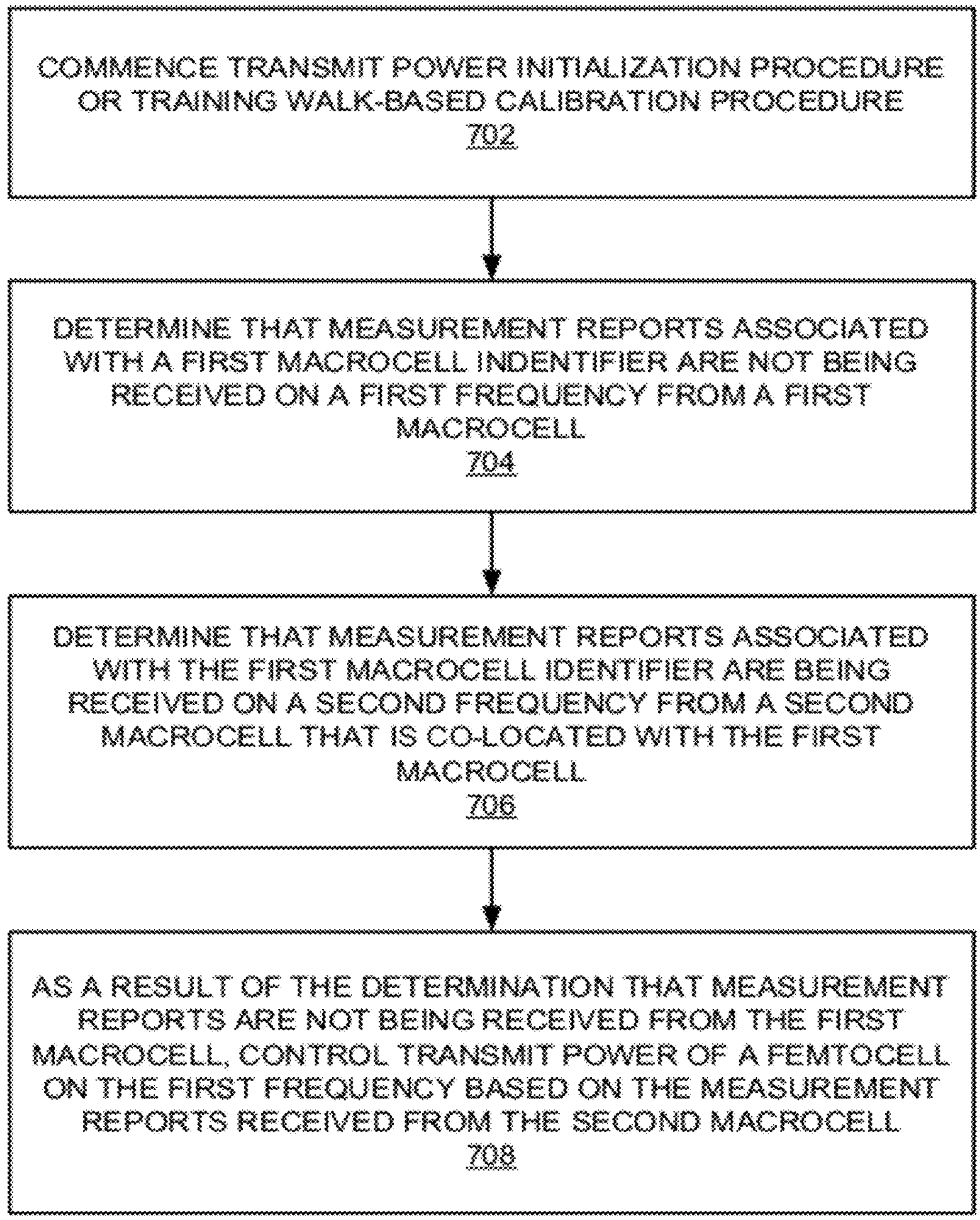
FIG. 7 is a flowchart illustrating several sample operations relating to using measurement reports from a co-located macrocell.

To address this issue, a co-located access point swapping scheme as described in FIG. 7 may be employed to obtain measurement report information. In some deployments, more than one macrocell is deployed at substantially the same location. In some cases, these co-located macrocells may use the same macrocell identifier one different frequencies. Moreover, these macrocells may transmit at the same or substantially the same power levels (e.g., within a few dBs). Thus, in the event an access terminal is unable to generate a measurement report for a first access point on a first frequency, the access terminal may measure a second co-located access point on another frequency as a surrogate for the first access point.

The operations of FIG. 7 may be performed, for example, at an access point (e.g., a femtocell) that receives measurement reports from a served access terminal, or at a network entity (e.g., that controls femtocell transmit power) to which such measurement reports are sent. Also, for purposes of illustration, these operations are described in the context of co-located macrocells and controlling femtocell transmit power. It should be appreciated, however, that these concepts may be employed for other types of access points.

As represented by block 702 of FIG. 7, a co-located access point swapping scheme may be employed for various types of transmit power calibration procedures. For example, such a scheme may be employed for network listen-based power calibration (e.g., as described at FIG. 4 above), a training walk-based calibration procedure, or for other types of measurements.

As represented by block 704, a determination is made that measurement reports associated with a first macrocell identifier are not being received on a first frequency from a first macrocell. For example, a failure to receive these measurement reports may be due to interference from the femtocell that is attempting to receive the measurement reports (e.g., via an NLM or via an access terminal) or due to interference from another femtocell. In some cases, this determination may be based on prior knowledge about the existence of the first macrocell. For example, an earlier calibration procedure may have successfully received measurement reports from the first macrocell on the first frequency. Hence, a subsequent calibration procedure will expect to receive measurement reports from this macrocell.

As represented by block 706, a determination is made that measurement reports associated with the first macrocell identifier are being received on a second frequency from a second macrocell that is co-located with the first macrocell. In some cases, this determination may be made as a result of initiating a search on other frequencies upon determining that a measurement report was not received from the first macrocell. In other case, measurements on multiple frequencies may be conducted irrespective of such a determination.

As represented by block 708, as a result of the determination that measurement reports are not being received from the first macrocell, the transmit power of a femtocell may instead be controlled based on the measurement reports received from the second macrocell. For example, as discussed above, such a measurement report may include signal strength information, path loss information, etc., that may be used to adjust transmit power to meet at least one criterion at the points where the measurement reports were taken. Thus, as discussed herein, transmit power may be controlled here to meet one or more of: a handover criterion, an SNR criterion, a macrocell protection criterion, a pilot signal quality criterion, an adjacent channel protection criterion, or some other criterion.

Various modifications may be made to the described embodiments in different implementations. In the above discussion, the beacon transmit power is calculated on a first macrocell frequency. The beacon transmit powers for any other macrocell frequencies may be calculated as an offset from the first macrocell frequency. Here, the offset may be calculated, for example, based on the difference in the macrocell received powers for these different frequencies as determined through the use of the network listen module or some other means. In this way, additional training walks need not be conducted to acquire information for the other macrocell frequencies.

In the above description, it is assumed that the access terminal performs multiple hard hand-offs during the training walk. In some 1x and DO femtocell networks, however, soft handoff (SHO) is supported between femtocells. In such a scenario, all measurement messages sent by a mobile are decoded by a network entity (e.g., a BSC). A femtocell also may also be configured to act as a BSC. This femtocell anchors the call and collects all measurement reports sent by the mobile. In such a deployment, the power calibration could be done by several methods which are slight variations of the methods described above. For example, the anchor femtocell can distribute the collected reports (over the backhaul) to different femtocells. Each femtocell is sent all the reports where its signal strength is the strongest or within a certain margin (e.g., "X" db) of the strongest femtocell. After receiving measurement reports, femtocells calibrate their power using procedures described earlier. The coverage performance target could be relaxed (e.g. use a lower ⟦ 1x_Ecp/Nt ⟧ threshold) as there is some gain due to SHO in 1xFL. Alternately, the SHO gain in 1xFL can be accounted for by asking each femtocell in SHO to transmit at a power inversely proportional to its path loss to the mobile while covering points in the SHO region. Similarly, when inter-femtocell SHO is supported between DO femtocells, a BSC (or a femtocell acting as a BSC) will receive all measurement reports. In such case, the BSC can distribute reports amongst femtocells based on relative pilot strengths of different femtocells as described above. Also, in a case wherein one entity collects all of the reports, that entity may employ optimizations to calculate the transmit power for the femtocells. For example, the sum powers in the system may be constrained within a desired limit.

As discussed above, the femtocells may share the channel being used by the macrocells. In this case, the femtocell power on the service channel would have to be strong enough to attract the users onto the femtocell and also provide good SNR. Beacons would be transmitted on the non-shared macro channels as above.

The disclosed power control technique may be employed in residences by the owner, in shops and also big enterprises by the IT staff or a technician. It is applicable to single and multi-femtocell deployments with closed or open access policy.

If the information from all the reports is available with one network entity (e.g. the BSC), the network entity can run the algorithms described herein to calculate optimal power levels for good coverage and minimal macro network impact and then convey these power levels to all of the femtocells.

If the deployment is closed access, the process of report collection can be crowd sourced to the active femtocell users. This could be problematic in open access deployment as users outside the intended coverage area could also be active on the femtocell. However, any unwanted reports may be filtered out as discussed herein. Also, the femtocells can use the registration/session setup statistics of users not belonging to the white list as an indicator of outside leakage and adapt their powers accordingly.

Although examples for 1xRTT, 1xEV-DO, and UMTS have been described in detail. It should be appreciated that the teachings herein are applicable to other wireless technologies as well. Thus, a power control scheme as taught herein may be employed in an LTE system, or some other type of wireless system.

For purposes of illustration, additional details relating to calculating transmit power calibration for a 1xRTT implementation, a 1xEV-DO implementation, and a UMTS implementation will now be described in turn.

Sample Details: 1xRTT Transmit Power Calibration

This section gives more insight into the SMART procedure. It is assumed that the femtocells are deployed on a dedicated channel which is adjacent to the macro channel. Dedicated deployment implies that femtocells have their own (dedicated) RF frequency channel, which is different from macrocells RF frequency channel. Modifications are described later for the shared channel scenario, where the same RF frequency channel is used by both the macrocell and the femtocell.

First, the number of femtocells is decided based on the total area to be covered and the intended coverage area per femtocell. They are placed uniformly and care is taken to keep them away from the edges to minimize macro network impact. Some other factors which affect this are the shape and construction of the building and the availability of Ethernet and GPS points which are essential for femtocell functionality. Detailed steps for transmit (Tx) power calibration of 1xRTT femtocells are given below.

1) Initialization:

The following steps are performed by each femtocell to determine the initial power levels using Network Listen Module (Note that all quantities described are in dBm or dB units):

a) Tune the NLM to the adjacent macro frequency and measure the total received energy ($Io_{macro\_NL}$)

b) Let $PL_{femto\ boundary\_1x}$ be the target coverage area for initialization. This is chosen to be on the higher side, 100 dB for instance, to ensure complete coverage before the power adjustment stage.

c) Calculate the required femtocell power based on the following equations:

If the deployment is on a dedicated channel:

$$P_{femto\_init\_1x}=Io_{macro\_NL}+PL_{femto\ boundary\_1x}+C$$

C is a configurable parameter chosen based on the target SNR, adjacent channel interference ratio and some additional margin required for transmit power.

If the deployment is co-channel to the macrocell, then initial transmit power is calculated similarly. However in this case, macrocell measurements are done on the co-channel instead of the adjacent channel.

Once all the femtocells have performed NLPC, the maximum of these NLPC values is obtained:

$$P_{femto,init,max}=\max_i(P_{femto\_init\_1x})$$

Now each femtocell is initialized to the value given by:

$$P_{femto,init}=P_{femto\_init\_1x}+\min(CAP_{init},P_{femto,init,max}-P_{femto\_init\_1x})$$

Here, $CAP_{init}$ is a configurable value (e.g., 15 dB). The goal here is to have the same initial power across all femtocells but keep a limit on the increase in power from the initial NLPC value. This NLPC algorithm achieves a good tradeoff between both these opposing requirements.

This can be done manually by the technician or the femtocells can communicate their powers to each other over the backhaul and all of them choose the maximum. Note that initialization may be done differently also. For example, all femtocells can be set to their maximum possible transmit power level. However, this is not recommended since using maximum transmit power may cause high interference.

2) Power Adjustment:

This is the most important stage of the femtocell deployment process and helps tune the powers of all the femtocells to the desired levels. It is illustrated in a few simple steps.

After initialization, a call is to be initiated on the femtocell channel and the active mobile is taken to all the regions in the house/enterprise where coverage is desired. This is done to collect RF measurements from everywhere and set the optimum power values.

During the call, the femtocells use standard signaling procedures and request the mobile to periodically submit measurement reports. The two measurement reports (defined in cdma2000 1xRTT standard) used are: 1) Pilot Strength Measurement Messages (PSMMs): As part of a PSMM, the mobile reports the Ecp/Io of the various femtocell PNs (pseudorandom noise sequences or codes) it can detect on its operating frequency and the total received energy Io. If the deployment is co-channel, the macrocells on this channel are also reported in the PSMM; 2) Candidate Frequency Search Report Messages (CFSRPMs): As part of the candidate frequency search (CFS) procedure, the femtocell requests the mobile to tune to a specified macro frequency and report the Ecp/Io of various macro PNs it can detect and the total received energy Io in the CFSRPM.

These reports are obtained from the mobile periodically (e.g. every 2-3 seconds) to get a good sampling of the area. PSMM and CFSRPM messages that arrive within a short span of each other are combined together to form one measurement report. Femtocells can time synchronize requests of these messages so that they arrive in short span of each other (e.g. by scheduling requests very close in time, by using ACTION_TIME field available in CFS request messages, etc.).

Femtocells use the mobile reports to calculate the power required to provide good coverage at each of the reporting points. The mobile is assumed to be performing hard handoffs between femtocells during the training walk as the strengths of the femtocells change and the PSMMs keep going to the serving femtocell. The hand-off hysteresis is set to 0 dB to ensure the serving femtocell is always the strongest one but this parameter can be adjusted. (Note that this hysteresis value can be configured by means of different parameters such as T_ADD, ADD_INTERCEPT, etc. available in the 1xRTT standard.) At the end, each femtocell forms a subset of reports (points) where it's received strength is the highest among all the femtocells and attempts to provide coverage at the points from which these reports were obtained. It calculates the beacon and femtocell powers required at all these points and then chooses a power value for these channels as follows:

Beacon Power:

To facilitate idle mobile hand-in, the strength of the beacon at the reporting point needs to be higher than the strongest macrocell by the hysteresis margin $1x\_beacon_{hyst}$. For the 'i'th measurement report, the required beacon transmit power is calculated using the equation:

$$P_{beacon\_1x}(i)=Ecp_{macro_{report}}(i)+PL_{report}(i)+K$$

Here $Ecp_{macro_{report}}(i)$ is the strength of the strongest macrocell pilot from the 'i'th CFSRPM report and is calculated by adding the Ecp/Io and Io which the mobile measures, K is constant based on typical handoff hysteresis value and required margin in transmit power, $PL_{report}(i)$ is the path loss to the reporting point and is calculated using the PSMM report by the equation:

$$PL_{report}=P_{femto}+Ecp/Ior_{femto}-(Ecp/Io_{PSMM}+Io_{PSMM})$$

Here, $Ecp/Ior_{femto}$ is the ratio of pilot channel power to the total transmit power on femtocell FL channel.

Thus, a set $\{P_{beacon\_1x}(i)\}$ of power level required to provide beacon coverage at all the reported points is formed.

The femtocells may use a layered beacon design. For this layered beacon design, the high and low beacon transmit powers are chosen as some statistical value (e.g. median, average, maximum, or certain percentile value out of the set). The statistical value chosen for high power is higher than the low power beacon.

Since beacons are required only once to reselect to the femtocell channel, their coverage targets are kept low in order to minimize impact on macrocell users.

In case the deployment of femtocells is co-channel to macrocells, the beacon power also depends on the femtocell power. The femtocell power in co-channel is set conservatively to protect the macro. As a result it is important to keep track of the femtocell power because if the beacon coverage is larger than femtocell coverage, it will lead to failed idle hand-in. The femtocell power is used to compute a limit on the high beacon power such that high beacon coverage is smaller than femtocell.

Because of this dependence, the femtocell power is calculated before the beacon power in co-channel deployment.

Femtocell Power:

The algorithm for femtocell power calibration depends on the nature of deployment: dedicated or co-channel.

Dedicated Deployment with Macrocell on Adjacent Channel:

The femtocell power is set so as to provide good coverage to the femtocell users while at the same time limiting the interference caused to the macrocell users on the adjacent channel.

a) Coverage Constraint:

To provide good coverage the femtocell power is set to achieve a target $SNR(1x\_Ecp/Nt_{threshold})$ at the reporting point. The interference here is due to the leakage from the adjacent macro channel. The power required for the 'i'th reporting point is calculated using the equation:

$$P_{femto_{1x}}(i)=Io_{macro_{report}}(i)+PL_{report}(i)+C$$

Here $Io_{macro_{report}}(i)$ is the total interference on the macro channel. To exclude the leakage from the femtocell channel, this is calculated by adding the energies of all the reported macros. $PL_{report}(i)$ is obtained from the PSMM as described above and C is a constant factor determined by a combination of adjacent channel leakage ratio, required SNR target and some additional margin required in transmit power. The interference from other femtocells is excluded in this calculation and is mitigated by including appropriate margin in parameter C. This is important to prevent power racing which could result if each femtocell attempted to overcome the interference being caused by the others.

The femtocell now chooses a power which ensures most reporting points get good coverage, just leaving out the outliers as:

$$P_{femto\_coverage\_1x}=Cov_{femto}\%\text{ ile value in the CDF of }\{P_{femto\_1x}(i)\},$$

Here, $\{P_{femto\_1x}(i)\}$ is the set of powers computed for all reporting points and $Cov_{femto}$ is configurable and typically chosen to be 95.

b) Macro Protection Constraint:

When femtocells are operating on a channel adjacent to the macro, the interference will hurt the macrocell users continuously. This is especially important if the deployment is closed access. To keep the impact under control the femtocell sets its power so as to limit its contribution to macrocell interference to be a fraction (designated $Io_{\Delta}$) of the macrocell-only interference. This is done as follows:

For each reporting point, calculate the power limit as given by the equation:

$$P_{femto\_1x_{limit}}(i)=Io_{macro_{report}}(i)+PL_{report}(i)+Z$$

Here, Z is a constant that determines the level of macrocell protection required. The femtocell calculates a power limit to protect a certain fraction (e.g., 50%) of the points. Uniform sampling of the area ensures that macrocell users on the adjacent channel are protected within 50% of region around a femtocell.

$$P_{femto\_protection\_1x}=\text{Prot}_{macro}\%\text{ ile value in cumulative distribution function (CDF) of }\{P_{femto\_1x_{limit}}(i)\}$$

The parameter $\text{Prot}_{macro}$ is configurable and, in some implementations, is chosen to be 50.

The final femtocell power is chosen to be the minimum of the coverage and macrocell protection.

Co-Channel Deployment:

In this scenario, the femtocell signal is used to provide coverage to femtocell users and also to trigger macrocell users on the co-channel to reselect to the femtocell. Thus, the femtocell signal also acts like a beacon. The power setting takes into account both of these requirements at each point.

a) SNR Constraint:

The femtocell SNR at the target point should be equal to the configured threshold—$SINR_{femto,max}$. Thus:

$$P_{femto_{1x}}(i)=Io_{macro_{report}}(i)+PL_{report}(i)+C$$

Here, C is chosen as a function of the SNR target $SINR_{femto,max}$ and additional margin desired in transmit power.

b) Idle Hand-Off Constraint:

The femtocell pilot strength is targeted to be higher than the strength of the best macrocell pilot by the hysteresis margin. This is done to keep the enterprise boundary between the idle hand-in and idle hand-out boundaries for the co-channel mobiles—which means that most users inside the enterprise will be able to reselect from the macro channel to the femtocell channel and secondly that one on the femtocell channel, the users will not go back to the macro network while inside the enterprise. The exact location of the boundary is controlled by the hysteresis value. Thus:

$$Ptx_{handoff}(i)=Ecp_{best\ macro,report}(i)+PL_{report}(i)+K$$

$$Ptx_{temp}(i)=\max(P_{femto\_1x}(i),Ptx_{handoff}(i))$$

Here, K is chosen based on typical handoff hysteresis and some additional margin in transmit power value.

Choosing the maximum of the powers at each point ensures that the power satisfies both the coverage constraint and idle handoff constraints at each point.

The femtocell now chooses a power which ensures most reporting points get good coverage, just leaving out the outliers as:

$$P_{femto\_coverage\_1x}=Cov_{femto}\%\text{ ile value in the CDF of }\{P_{femto\_1x}(i)\}$$

Here, $\{P_{femto\_1x}(i)\}$ is the set of powers computed for all reporting points and $Cov_{femto}$ is configurable and, in some implementations, is chosen to be 95.

3) Power Optimization:

The femtocell powers are fine tuned for best performance by raising certain event triggers/alarms such as for instance, triggers for incorrect locations, insufficient coverage, reverse link performance impact, etc. Several examples of such triggers are described below:

Power difference: The power difference between two femtocells that share a coverage boundary should not be greater than 10 dB. This is important to minimize FL/RL imbalance issues.

Serving path loss: The fraction of path loss values exceeding 85 dB from which each femtocell gets measurement reports should be lower than 5%. Note that these path loss values may be obtained from the technician walk prior to transmit power adjustment or by performing new walk and collecting new set of reports with femtocells transmitting at their newly computed transmit power values. This optimization trigger ensures the coverage area of each femtocell is restricted to within 85 dB. If coverage expands beyond this point, femtocell users at the edge may transmit at very high power to maintain their link and cause undesirably high ROT (rise-over-thermal) at a nearby macrocell.

Power capping: None of the femtocells should reach the maximum power limit on the beacon or the femtocell channel as it indicates that the coverage criteria could not be met at a few points.

If any of these conditions is triggered, the position of a few femtocells is to be changed or another femtocell is to be added in the region where a trigger was raised. After this, the entire calibration procedure is to be repeated.

Sample Details: 1xEV-DO Transmit Power Calibration

This section describes additional aspects of an embodiment of the SMART procedure and how it may be deployed in a 1xEV-DO implementation (e.g., which may be referred to here as EV-DO or simply DO). In this example, it is assumed that the DO femtocells are deployed either on a channel shared with the macro channel or a dedicated channel is set aside for them. For dedicated deployments, it is assumed that the femtocells are deployed on a dedicated channel which is adjacent to the macro channel. The femtocell beacon is transmitted on the macro channel in SMART for dedicated DO deployments. The following steps occur in conjunction with 1xSMART procedures.

1) Initialization:

Femtocell Power:

Femtocell i measures $Io_{macro,NLM,i}$ (dBm) which is the total macrocell RSSI measured on the femtocell's frequency of operation. If no macrocell is detected, $Io_{macro,\ NLM,i}$ is set as the thermal noise floor. The femtocell then calculates P, to provide coverage in the region represented by $PL_{edge,femto}$ (e.g. 90 dB):

$$P_i = K + Io_{macro,NLM,i} + PL_{edge,femto}$$

Here, K is a function of the required Ecp/Nt target and additional margin desired in transmit power value.

The temporary transmit power of femtocell i is then calculated as:

$$P_{femto,DO,i} = \min(\max(P_i, P_{min,femto}), P_{max,femto})$$

Here, $P_{min,femto}$ and $P_{max,femto}$ are the minimum and maximum permitted transmitted power levels in dBm respectively for femtocell.

Once all the femtocells output their respective NLPC powers, the technician decides on the initialization power to be used by each femtocell as follows. Denoting:

$$P_{femto,init,max} = \max_i(P_{femto,i}).$$

The initialization power of femtocell i is then:

$$P_{femto,DO,init,i} = P_{femto,DO,i} + \min(CAP_{init,DO}, P_{femto,DO,init,max} - P_{femto,DO,i})$$

Here, $CAP_{init,DO}$ is a constant (e.g., 15 dB) that caps the allowed power increase. This method allows the technician to increase each individual femtocell's initial power to be as close to $P_{femto,DO,init,max}$ as possible, without violating the $CAP_{init,DO}$ increase limit.

This femtocell power initialization applies to both co-channel and dedicated deployments, although some parameters could be different, e.g., $PL_{edge,femto}$.

Beacon Power:

A similar algorithm runs at each femtocell for deciding the initial beacon power as well: Femtocell i measures $Io_{beacon,NLM,i}$ (dBm) which is the total macrocell RSSI measured on the macrocell's frequency of operation. The femtocell then calculates "i" to provide beacon coverage in the region represented by $PL_{edge,beacon}$ (e.g. 95 dB):

$$P_i = K + Io_{beacon,NLM,i} + PL_{edge,beacon}$$

Here, K is chosen as a function of desired beacon pilot strength (Ecp/Io) at the edge of femtocell coverage and some additional margin in transmit power value. In the context of the beacon, coverage merely means that the beacon should be searchable during the technician assisted power adjustment stage.

The temporary transmit power of beacon i is then calculated as:

$$P_{beacon,DO,init,i} = \min(\max(P_i, P_{min,beacon}), P_{max,beacon})$$

Here, $P_{min,beacon}$ and $P_{max,beacon}$ are the minimum and maximum permitted transmitted power levels in dBm respectively for beacon.

Unlike femtocell power, each femtocell's beacon may have different values, without taking the maximum operation with a cap. This is done to minimize beacon's impact on the macrocell Ecp/Io measurements and, hence, to reduce the risk of no femtocell/macrocell Ecp/Io reporting problem.

This beacon power initialization applies to both co-channel and dedicated deployments, although some parameters could be different, e.g., $PL_{edge,beacon}$.

2) Power Adjustment:

This is the most important stage of the femtocell deployment process and helps tune the powers of all the femtocells to the desired levels. It is illustrated in a few steps.

After initialization, a data session is initiated on the femtocell channel and the active mobile is taken to all the regions in the house/enterprise where coverage is desired. This is done to collect RF measurements from everywhere and set the optimum power values.

During the call, the femtocells use standard signaling procedures and request the mobile to periodically submit measurement reports. The requests are sent using the Route Update Request message. The reporting message used is the Route Update Message (RUM). In the RUM, the access terminal reports the Ecp/Io of all the PNs it can detect on its operating frequency and the requested frequency. These reports are obtained from the mobile, for example, every few second(s) to get a good sampling of the area.

However, unlike in the 1xRTT case, EV-DO access terminal reports only contain Ecp/Io of various sectors, and they do not contain the Io measurements. This means that direct path loss report is not available to the EV-DO femtocell and beacon power calibration, which is a major difference to the 1xRTT SMART.

The following EV-DO SMART algorithm demonstrates how Ecp/Io reports of DO macrocells and beacons may be used to compute the femtocell and beacon transmit power satisfying certain criteria, when these reports are available through the technician training walk. When these reports are not available, 1xRTT access terminal reports may be used to compute the femtocell and beacon transmit power.

The idea of power calibration is to use the mobile reports to calculate the power required to provide good coverage at each of the reporting points. In this example, the mobile is assumed to be performing hard hand-offs between femtocells during the training walk as the strengths of the femtocells change and the RUMs keep going to the serving femtocell. If hard handoff is supported, the hand-off hysteresis is set (e.g., to 0 dB) to ensure the serving femtocell is always the strongest one (this parameter may be adjusted, however). This hysteresis value may be configured by means of different parameters such as PilotAdd, AddIntercept, SoftSlope, PilotCompare, etc., available in DO standard. If hard handoff is not supported and there is no soft handoff, the access terminal may be redirected to the strongest femtocell by the serving femtocell based on the measurement reports it receives. For example, when the reports indicate that a target femtocell has become stronger, the serving femtocell can send a connection close command, based on which the access terminal closes the connection, goes to idle, reselects to the target femtocell, sets up a data connection and continues to send the reports. If soft handoff is supported, some femtocells will collect not only those reports for which it is the serving femtocell (i.e., the strongest femtocell), but also other reports where another femtocell is the strongest. In this case, the femtocell can either directly re-distribute these reports to the corresponding strongest femtocell, or send all reports to a control center (e.g., a centralized entity) that is in charge of collecting all reports and re-distributing them to the corresponding strongest femtocells. By any of the aforementioned methods, at the end, each femtocell forms a subset of reports (points) where its received strength is the highest among all the femtocells in the reports and attempts to provide coverage at the points from which these reports were obtained. It calculates the beacon and femtocell powers required at all these points and then chooses the power as follows:

Co-Channel Deployment

Femtocell Power:

The femtocell power is adjusted keeping in mind the impact on co-channel macro. The power should be enough to provide idle mode and active mode coverage to the access terminals being served by the femtocell. In order for a user to keep camping on the femtocell, its signal strength should not be much weaker than the strongest macrocell signal strength, otherwise, the access terminal will perform an idle handoff to the macro. The amount by which the femtocell signal strength can be weaker by the macrocell and still keep camping on the femtocell depends on the hysteresis value used for performing idle handoff. A typical value is 3-5 dB. Keeping this in mind, the power adjustment is performed as follows:

Idle Handout Constraint:

Femtocell i constructs the set $\{P_{delta,temp1,i}\}$ which is the increment or decrement in transmit power for each reporting point in order to satisfy the idle handoff coverage constraint at that point. For the 'j'th report, this is done as follows:

$$P_{delta,temp1,i}(j) = \left(\frac{Ecp}{Io}\right)_{best\ macro,i}(j) - \left(\frac{Ecp}{Io}\right)_{femto,i}(j) + K$$

Here, K is chosen as a function of typical idle handoff hysteresis value and some desired additional margin in transmit margin, $Ecp/Io_{best\ macro,i}(j)$ is the Ecp/Io of the best (strongest in terms of Ecp/Io) macrocell reported in the $j^{th}$ measurement report and $(Ecp/Io)_{femto,i}(j)$ is the femtocell's Ecp/Io reported in the $j^{th}$ measurement report. With −5 dB $Hyst_{femto}$, idle handoff from femtocell to macrocell occurs, whereas with 5 dB $Hyst_{femto}$, idle handoff from macrocell to femtocell occurs.

Femtocell i computes $P_{feminc,temp1,i}$ as the $Cov_{femto,DO}$ (e.g. 95%) percentile value of CDF of set of $P_{data,temp1,i}$ values. This ensures that $Cov_{femto,DO}$ percent of the reporting points satisfy the idle handoff condition.

Femtocell i computes its calibrated transmit power as:

$$P_{femto\_temp1,i} = P_{femto,DO,i} + P_{feminc,temp1,i}$$

SNR Constraint:

Femtocell i constructs the set $\{P_{delta,temp2,i}\}$ which is the increment or decrement in transmit power for each reporting point in order to satisfy the SNR coverage constraint at that point. The required increment or decrement for the 'j'th report is computed based on macrocell and femtocell pilot strength reported in the 'j'th report. Femtocell i computes $P_{feminc,temp2,i}$ as the $Cov_{femto,DO}$ (e.g. 95%) percentile value of CDF of set of $P_{delta,temp2,i}$ values. This ensures that $Cov_{femto,DO}$ percent of the reporting points satisfy the idle handoff condition.

Femtocell i computes its calibrated transmit power as:

$$P_{femto\_temp2,i} = P_{femto,DO,i} + P_{feminc,temp2,i}$$

Finally, femtocell power is set as:

$$P_{femto,temp,i} = \max\{P_{femto\_temp1,i}, P_{femto\_temp2,i}\},$$

$$P_{femto,final,i} = \min(\max(P_{min,femto}, P_{femto,temp,i}), P_{max,femto}).$$

Here, $P_{min,femto}$ and $P_{max,femto}$ are absolute minimum and maximum configured values of femtocell transmit power.

The femtocell power computation above is based on EV-DO home access terminal (femtocell) measurement reports, which contain Ecp/Io of different sectors (macrocell, femtocell, and/or beacon). When these EV-DO reports are not available, the aforementioned power computation cannot proceed in this manner. In such scenario, one can re-use 1xRTT home access terminal measurement reports, if available, and perform the EV-DO power adjustment based on the 1xRTT reports. This approach assumes that both 1xRTT and EV-DO technologies are available on the same femtocell, and both 1xRTT and EV-DO power adjustment is performed, which is a very likely scenario.

Among all of the signal measurements within the 1xRTT home access terminal reports, only the path loss information, which is computed from the Ecp/Io reports and the Io reports, is used in the following method. However, other measurements or information contained in the 1xRTT home access terminal reports can be used for EV-DO power adjustment as well.

First the power adjustment algorithm computes the Cumulative Distribution Function (CDF) of the $\{PL_{femto,i}(j)\}$ using all the path loss reports collected in the 1xRTT measurement reports collection stage. Then, the algorithm computes $PL_{edge,1x}$=CovPer_$PL_{edge}$ percentile value on the CDF of the $\{PL_{femto,i}(j)\}$.

After $PL_{edge,1x}$ is obtained, the power adjustment algorithm repeats part of the femtocell power initialization procedure described above. This part of the procedure commences at the headings: "1) Initialization:" and "Femtocell power:" set forth above and includes the four paragraphs ending with "where $P_{min,femto}$ and $P_{max,femto}$ are the minimum and maximum permitted transmitted power levels . . . " (e.g., approximately paragraphs 00192-00195). Note that the remaining operations of this initialization procedure are not to be carried out here. The operations not to be performed include the three paragraphs commencing with "Once all the femtocells output their respective NLPC powers . . . " (e.g., approximately paragraphs 00196-00198). When repeating the part of the initialization procedure described in the preceding sentences, the procedure will substitute $PL_{edge,femto}$ with $PL_{edge,1x}$. The output power level, $P_{femto,DO,i}(PL_{edge,1x})$, is set as the femtocell power:

$$P_{femto,final,i} = P_{femto,DO,i}(PL_{edge,1x}).$$

Beacon Power:

For each macro channel where a proper beacon power needs to be calibrated, the femtocell will invoke the NLM module to measure the macrocell Ecp/Io on this beacon channel. Assuming that a beacon is transmitted on frequency fi, the beacon's transmit power is set relative to the femtocell's transmit power as follows $$P_{beacon,fi,temp} = P_{femto,final,i} + K$$

$$P_{beacon,final,i} = \min(\max(P_{min,beacon}, P_{beacon,fi,temp}), P_{max,beacon})$$

Here, $P_{femto,final,i}$ is the calibrated femtocell transmit power; K is chosen as a function of difference in NLM measured macrocell pilot strength on frequency fo and macrocell pilot strength on frequency fi and some desired additional margin in transmit power. The additional margin is used to reduce the probability of the event that a user performs idle hand-in from beacon due to an upfade but fails to acquire the femtocell signal due to a downfade.

Dedicated Deployment

Femtocell Power:

To provide good femtocell coverage while avoiding leakage to the adjacent channel on which a macrocell could be operating, the dedicated femtocell power calibration involves two constraints: femtocell coverage and macrocell protection. More specifically, the following procedure is carried out for femtocell power calibration:

Let $S_i$ be the set of reports from the femtocell frequency and the beacon frequency received at femtocell i containing the Ecp/Io measurements from various sectors. If not specifically identified, all specified variables are in dB domain.

Femtocell Coverage Constraint.

Compute the transmit power required to provide good coverage (e.g., defined as having SNR>5 dB) as follows:

Femtocell i constructs the set $P_{temp1,i}$ as follows:

$$P_{temp1,i}(j) = P_{B,i} + 10\log_{10}\left(\sum_k \left(\frac{Ecp}{Io}\right)_{macro,k,i}(j)\right) - \left(\frac{Ecp}{Io}\right)_{beacon,i,i}(j) + K$$

Here, $(Ecp/Io)_{macro,k,i}(j)$ is in linear domain representing the Ecp/Io of the $k^{th}$ macrocell reported in the $j^{th}$ report of $S_i$, and $(Ecp/Io)_{beacon,i,i}(j)$ is the Ecp/Io of the $i^{th}$ beacon reported in the $j^{th}$ report of $S_i$. $P_{B,i}$ is the beacon power after initialization for the $i^{th}$ femtocell and K is a function of the desired SNR target and some desired additional margin in transmit power value. This constraint ensures that the location corresponding to this report does not receive more than certain SNR (e.g. 5 dB) signal quality. This prevents unnecessary interference.

Femtocell i computes the transmit power corresponding to this constraint as follows:

$$P_{femto,coverage,i} = Cov_{femto} \text{ percentile (e.g. 95\%) of } P_{temp1,i}$$

That is, the power to satisfy this coverage constraint for 95% of the reports.

Macro Protection Constraint:

Compute transmit power that can be used while protecting adjacent channel macrocells as:

Femtocell i constructs the set $P_{temp2,i}$ as follows:

$$P_{temp2,i}(j) = P_{B,i} + 10\log_{10}(\Sigma_k (Ecp/Io)_{macro,k,i}(j)) - (ECP/Io)_{beacon,i,i}(j) + C$$

Here, C is a function of the level of protection (e.g., 5 dB below macrocell strength) and some additional margin.

Then, Femtocell i computes the transmit power corresponding to this constraint as follows:

$$P_{femto,protection,i} = \text{Prot}_{macro} \text{ percentile of } P_{temp2,i}$$

Each femtocell's power is then computed as:

$$P_{femto,final,i} = \min(\max(\min(P_{femto,coverage,i}, P_{femto,protection,i}), P_{min,femto}), P_{max,femto})$$

Similar to the co-channel deployment, it is also possible to calibrate the femtocell power based on 1xRTT home access terminal measurement reports, provided both technologies co-exist in the same femtocell and 1xRTT home access terminal measurement reports have been collected for 1xRTT power adjustment. Again, while only path loss information is used in the following procedure, other measurements reports may also be used in the computation.

Beacon Power:

To facilitate idle mobile hand-in, the strength of the beacon at the reporting point should be higher than the strongest macrocell by the hysteresis margin $\text{beacon}_{hyst,DO}$. To achieve this, femtocell i constructs the set $\{P_{delta,i}\}$ which is the increment or decrement in transmit power for each point in order to satisfy the idle handoff coverage constraint at that point. This power value is computed as follows:

$$P_{delta,i}(j) = \left(\frac{Ecp}{Io}\right)_{best\ macro,i}(j) - \left(\frac{Ecp}{Io}\right)_{beacon,i}(j) + K$$

Here, $(Ecp/Io)_{beacon,i}$ (j) is the Ecp/Io of the $i^{th}$ beacon reported in the $j^{th}$ report sent to the $i^{th}$ femtocell. The parameter $(Ecp/Io)_{bestmacro,i}$ (j) is the Ecp/Io of the best macrocell reported in the $j^{th}$ report sent to the $i^{th}$ femtocell and K is chosen as function of typical handoff hysteresis and some additional margin in transmit power.

Femtocell i computes $P_{inc,i}$ as the $Cov_{beacon,DO}$ (e.g. 80%) percentile value of the CDF of $P_{delta,i}$. This ensures that $Cov_{beacon,DO}$ percent of the reports satisfy the idle handoff condition.

Femtocell i computes its beacon's calibrated transmit power as:

$$P_{beacon,final,DO,i} = P_{beacon,DO} + P_{inc,i}$$

As mentioned above, another approach is to re-use 1xRTT home access terminal measurement reports to compute the beacon transmission power. In some aspects, this approach is similar to the co-channel femtocell power computation based on 1xRTT home access terminal measurement reports. First, formulate the $\{PL_{femto,i}(j)\}$ of all path loss reports, compute $PL_{edge,1x,temp}$=CovBcn percentile value on the CDF of the $\{PL_{femto,i}(j)\}$, then apply a lower and upper bound on the allowed path loss target, and finally repeat beacon NLPC for dedicated deployment with the new path loss target $PL_{edge,1x,temp}$. The computed power is set as the final beacon power $P_{beacon,final,DO,i}$.

Once all of the femtocells have adjusted their powers based on this method, the next step is to optimize these power levels.

3) Power Optimization:

Power optimization may be done using the same operations described herein (e.g., for 1xRTT).

Sample Details: UMTS Transmit Power Calibration

This section describes additional aspects of an embodiment of the SMART procedure and how it may be deployed in a UMTS implementation.

Parameter Initialization in Power Calibration Mode

For the power calibration mode, an example of a set of parameters that may be employed follows. The MRM reporting interval and MRM reporting amount are set to 250 ms and infinity, respectively, to receive measurement reports periodically at short intervals and over a long duration. Furthermore, soft handover (SHO) may be disabled during the technician training walk.

If SHO is not disabled, reports may still be collected at each femtocell, or sent to one femtocell (e.g., that acts as cluster head) or sent to a separate entity. The described algorithms are applicable to either case.

Active call handovers may be managed through hard handovers (e.g., if SHO is disabled). For handovers between femtocells, using a hysteresis—CIO value of, for example, 0 dB may be employed. This allows femtocells to collect reports from regions where the femtocells are likely to be strongest. For handovers to macrocells, a hysteresis—CIO value of, for example, 6 dB may be employed. This will allow femtocells to obtain reports from those regions where the macrocell is stronger than the femtocell.

Transmit Power Initialization

Each femtocell uses a desired coverage range (as an input) and macrocell RSSI measurements taken using the NLM. The femtocell transmit power is chosen to satisfy coverage requirement. For example, the femtocell's CPICH $E_c$/Io may be defined to be better than $Q_{qualmin,femto}$ at the coverage range. Furthermore, to limit interference to the macrocell downlink, the femtocell transmission may be restricted to only increase macrocell Io by at most a certain fixed amount at the edge of the femtocell coverage range. Thus, at each femtocell the following conditions are met:

Coverage Condition:

The femtocell transmit power is chosen to satisfy an idle reselection requirement at the edge of the coverage range. For instance, the femtocell's CPICH $E_C$/Io should be better than $Q_{qualmin,femto}$ at the coverage range.

$$P_{femto,temp1}=PL_{Edge,NL}+Io_{macro,NLM}+X$$

The parameter X is based on: the minimum desired downlink CPICH Ec/$I_0$ experienced by a HUE (femtocell) assuming some loading at the edge of the femtocell coverage $PL_{edge,NL}$; the ratio of pilot energy per chip to the total transmit power spectral density (i.e., CPICH Ec/Ior); and a loading function.

The parameter $Io_{macro,NLM}$ is calculated by using the NLM to measure CPICH RSCPs of intra-frequency macrocells (or co-located macrocells as discussed herein). If no macrocells are detected, the parameter $Io_{macro,NLM}$ may be set to $N_0$.

Adjacent Channel (Other Operators) Protection Condition:

To limit the interference caused to an adjacent channel that belongs to another wireless network operator, additional requirements on output power are provided in Section 6.4.6 in 3GPP TS 25.104. In general, this requirement is based on a comparison of CPICH Ec and Io. The parameter $P_{femto,temp2}$ is defined as the total transmit power taking into account the adjacent channel protection condition as specified by these requirements.

Adjacent Channel (Same Operator) Protection Condition:

To limit interference caused to an adjacent channel macrocell that belongs to the same operator (e.g., the operator for the femtocell) additional requirements on the output power are provided below.

IF adjacent channel same operator condition is valid:

CPICH $RSCP_{adjacentchannel}$ [dBm] is the code power of the Primary CPICH (strongest PSC) on the adjacent channels measured by the NLM at the femtocell. (If transmit diversity is applied on the Primary CPICH, CPICH Ec shall be the sum in [W] of the code powers of the Primary CPICH transmitted from each antenna.)

The total transmit power limits are provided below:

IF $RSCP_{adjacentchannel} \geq -105$ dBm $P_{adjacentchannel,sameop} = PL_{protection,adjchan} + ACIR + RSSI_{adjacentchannel} + I_{0,thisfemto,contrib} - 10\log10(LF_{femto})$ [dBm]

ELSE $P_{adjacentchannel,sameop} = P_{femto,max}$

END

ELSE (IF)

$P_{adjacentchannel,sameop} = P_{femto,max}$

END(IF)

$P_{femto,min}$ [dBm]: Minimum permissible value of the total femtocell transmit power.

$P_{femto,max}$ [dBm]: Maximum permissible value of the total femtocell transmit power.

Let $P_{femto,temp3}=P_{adjacentchannel,sameop}$ be the total transmit power, taking into account the adjacent channel protection condition.

Femtocell transmit power is chosen to be the minimum of the three criteria.

$$P_{femto,NL}=\max[\min(P_{femto,temp1},P_{femto,temp2},P_{femto,temp3},P_{femto,max}),P_{femto,min}].$$

The above procedure is carried out at each femtocell in the unit (e.g., building). Suppose that there are n femtocells in the unit then:

$$P_{femto,NL}=[P_{femto,NL,1},P_{femto,NL,2}, \ldots, P_{femto,NL,n}].$$

The algorithm (or technician) picks the maximum of the computed transmit power levels:

$$P_{init}=\max(P_{femto,NL}),$$

The transmit power of the femtocells is then initialized to the same power $P_{init}$. Therefore, $$P_{femto,inuse}=P_{init}$$

This ensures that all femtocells are transmitting at sufficiently high power to ensure initial coverage; handover boundary between two femtocells lie at equal path loss from each femtocell; and tries to ensure mismatch between final powers (after technician assisted power adjustment step) is low. The next step is the technician assisted power adjustment.

Technician Assisted Power Adjustment

The technician initiates a voice call and walks around the unit. The following recommendations apply for the walk route taken by the technician: The technician walk should span the unit comprehensively and uniformly in order to report measurements from all regions where coverage is needed. It is recommended that the technician walk at a slow speed over the entire technician walk route. Multiple walks may be performed on the technician walk route to get more measurement reports (e.g., to mitigate estimation errors due to channel fading).

Femtocells collect the reports from the technician's mobile and use those where the femtocell ranks the highest CPICH Ec/Io. Due to equal transmit power values and 0 dB hysteresis+CIO, the measurement report messages (MRMs) will be sent to the closest femto (e.g., smallest path loss). For each measurement report message received, the femtocell extracts PL and macrocell RSSI. In addition, the femtocell computes the transmit power value as follows:

For each received measurement report message (i), a coverage condition is met. This coverage condition is calculated in a similar manner as the coverage condition described above for the Transmit Power Initialization except that the information is obtained from the measurements reports. For example, for each received measurement report message (i), a parameter $P_{femto,tech,i}$ is calculated based on the path loss, $Io_{macro,tech,i}$, and X; where the parameter $Io_{macro,tech,i}$ is calculated by using the access terminal measured CPICH RSCPs of intra-frequency macrocells (or co-located macrocells as discussed herein). If no macrocells are detected, the parameter $Io_{macro,tech,i}$ may be set to $N_0$.

Suppose that there are m reports collected at a femtocell then:

$$P_{femto,tech}=[P_{femto,tech,1},P_{femto,tech,2}, \ldots ,P_{femto,tech,m}].$$

The femtocell picks the covTxper percentile of the computed transmit power levels and initializes the downlink transmit power level of the femtocell to the same power. That is:

$$P_{SMART}=\max[\min(\text{percentile}(P_{femto,tech},\text{covTxper}),P_{femto,temp2},P_{femto,temp3},P_{femto,max}),P_{femto,min}].$$

Here, the function percentile computes covTxper percentile value of $P_{femto,tech}$; and $P_{femto,temp2}$ and $P_{femto,temp3}$ are obtained by computing the total output power taking into account the adjacent channel protection requirement for the same and other operator.

On completing the SMART procedure, femtocells start transmitting on the downlink with a total transmit power designated as $P_{SMART}$. Therefore, $$P_{femto,inuse}=P_{SMART}$$

The technician may perform multiple runs of the SMART procedure for fine tuning of the femtocell transmit power.

Figure 9:
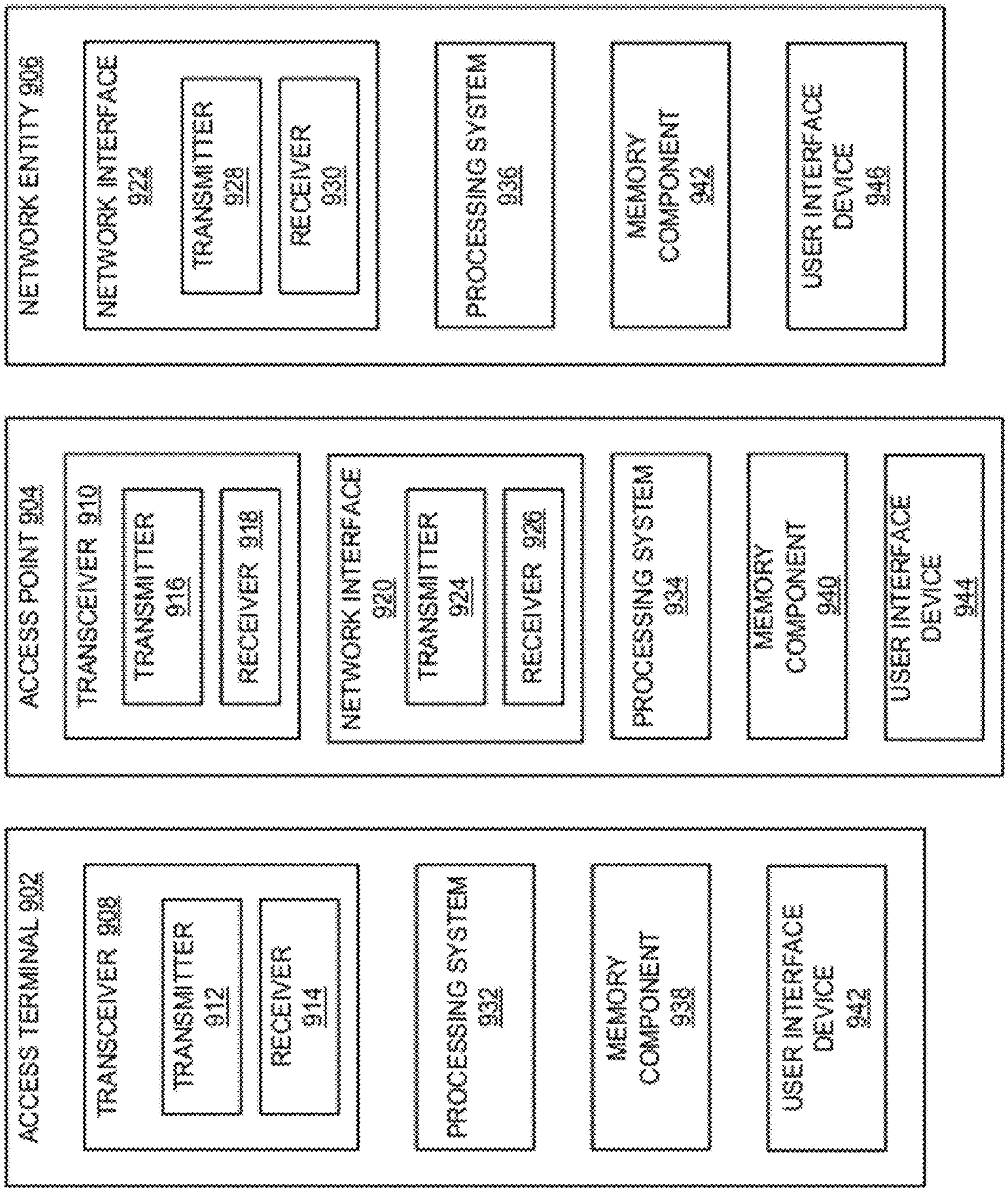
FIG. 9 is a simplified block diagram of several sample aspects of components that may be employed in communication nodes.

FIG. 9 illustrates several sample components (represented by corresponding blocks) that may be incorporated into nodes such as an access terminal 902, an access point 904, and a network entity 906 (e.g., corresponding to the access terminal 102, the access point 104, and the network entity 112, respectively, of FIG. 1) to perform transmit power control-related operations as taught herein. The described components also may be incorporated into other nodes in a communication system. For example, other nodes in a system may include components similar to those described for one or more of the access terminal 902, the access point 904, or the network entity 906 to provide similar functionality. Also, a given node may contain one or more of the described components. For example, an access point may contain multiple transceiver components that enable the access point to operate on multiple carriers and/or communicate via different technologies.

As shown in FIG. 9, the access terminal 902 and the access point 904 each include one or more wireless transceivers (as represented by a transceiver 908 and a transceiver 910, respectively) for communicating with other nodes. Each transceiver 908 includes a transmitter 912 for sending signals (e.g., messages, measurement reports, indications, other types of information, and so on) and a receiver 914 for receiving signals (e.g., messages, FL signals, pilot signals, handover parameters, other types of information, and so on). Similarly, each transceiver 910 includes a transmitter 916 for sending signals (e.g., messages, requests, indications, FL signals, pilot signals, handover parameters, other types of information, and so on) and a receiver 918 for receiving signals (e.g., messages, measurement reports, transmit power values, other types of information, and so on).

The access point 904 and the network entity 906 each include one or more network interfaces (as represented by a network interface 920 and a network interface 922, respectively) for communicating with other nodes (e.g., other network entities). For example, the network interfaces 920 and 922 may be configured to communicate with one or more network entities via a wire-based or wireless backhaul or backbone. In some aspects, the network interfaces 920 and 922 may be implemented as a transceiver (e.g., including transmitter and receiver components) configured to support wire-based or wireless communication (e.g., sending and receiving: messages, measurement reports, indications, handover parameters, transmit power values, other types of information, and so on). Accordingly, in the example of FIG. 9, the network interface 920 is shown as comprising a transmitter 924 for sending signals and a receiver 926 for receiving signals. Similarly, the network interface 922 is shown as comprising a transmitter 928 for sending signals and a receiver 930 for receiving signals.

The access terminal 902, the access point 904, and the network entity 906 also include other components that may be used to support power control-related operations as taught herein. For example, the access terminal 902 includes a processing system 932 for providing functionality relating to controlling transmit power (e.g., provide measurement report information, identify a reconfiguration triggering condition, generate an indication to reconfigure femtocells, determine that measurements reports are not being received, determine that measurements reports are being received) and for providing other processing functionality. Similarly, the access point 904 includes a processing system 934 for providing functionality relating to controlling transmit power (e.g., control transmit power, define a first handover hysteresis value, define a second handover hysteresis value, determine at least one transmit power value, configure at least one femtocell, provide measurement report information, identify a reconfiguration triggering condition, generate an indication to reconfigure femtocells, determine that measurements reports are not being received, determine that measurements reports are being received, control transmit power of a femtocell on the first frequency based on the measurements reports received from the second macrocell, determine a first transmit power level, determine a second transmit power level, determine a third transmit power level, select a minimum transmit power level from the first transmit power level, the second transmit power level, and the third transmit power level, control transmit power of a femtocell) and for providing other processing functionality. Also, the network entity 906 includes a processing system 936 for providing functionality relating to controlling transmit power (e.g., as described above for the processing system 934) and for providing other processing functionality. The access terminal 902, the access point 904, and the network entity 906 include memory components 938, 940, and 942 (e.g., each including a memory device), respectively, for maintaining information (e.g., measurement report information, thresholds, parameters, and so on). In addition, the access terminal 902, the access point 904, and the network entity 906 include user interface devices 942, 944, and 946, respectively, for providing indications (e.g., audible and/or visual indications) to a user and/or for receiving user input (e.g., upon user actuation of a sensing device such a keypad, a touch screen, a microphone, and so on).

For convenience the access terminal 902 and the access point 904 are shown in FIG. 9 as including components that may be used in the various examples described herein. In practice, the illustrated blocks may have different functionality in different implementations. For example, the processing systems 932, 934, and 936 will be configured to support different operations in implementations that employ different wireless communication technologies.

The components of FIG. 9 may be implemented in various ways. In some implementations the components of FIG. 9 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some of the functionality represented by block 908 and some or all of the functionality represented by blocks 932, 938, and 942 may be implemented by a processor or processors of an access terminal and data memory of the access terminal (e.g., by execution of appropriate code and/or by appropriate configuration of processor components). Similarly, some of the functionality represented by block 910 and some or all of the functionality represented by blocks 920, 934, 940, and 944 may be implemented by a processor or processors of an access point and data memory of the access point (e.g., by execution of appropriate code and/or by appropriate configuration of processor components). Also, some or all of the functionality represented by blocks 922, 936, 942, and 946 may be implemented by a processor or processors of a network entity and data memory of the network entity (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macrocell, and so on. Also, a femto access point may be configured or referred to as a Home NodeB, Home eNodeB, access point base station, femtocell, and so on. In some implementations, a node may be associated with (e.g., referred to as or divided into) one or more cells or sectors. A cell or sector associated with a macro access point, a femto access point, or a pico access point may be referred to as a macro cell, a femtocell, or a picocell, respectively.

Figure 10:
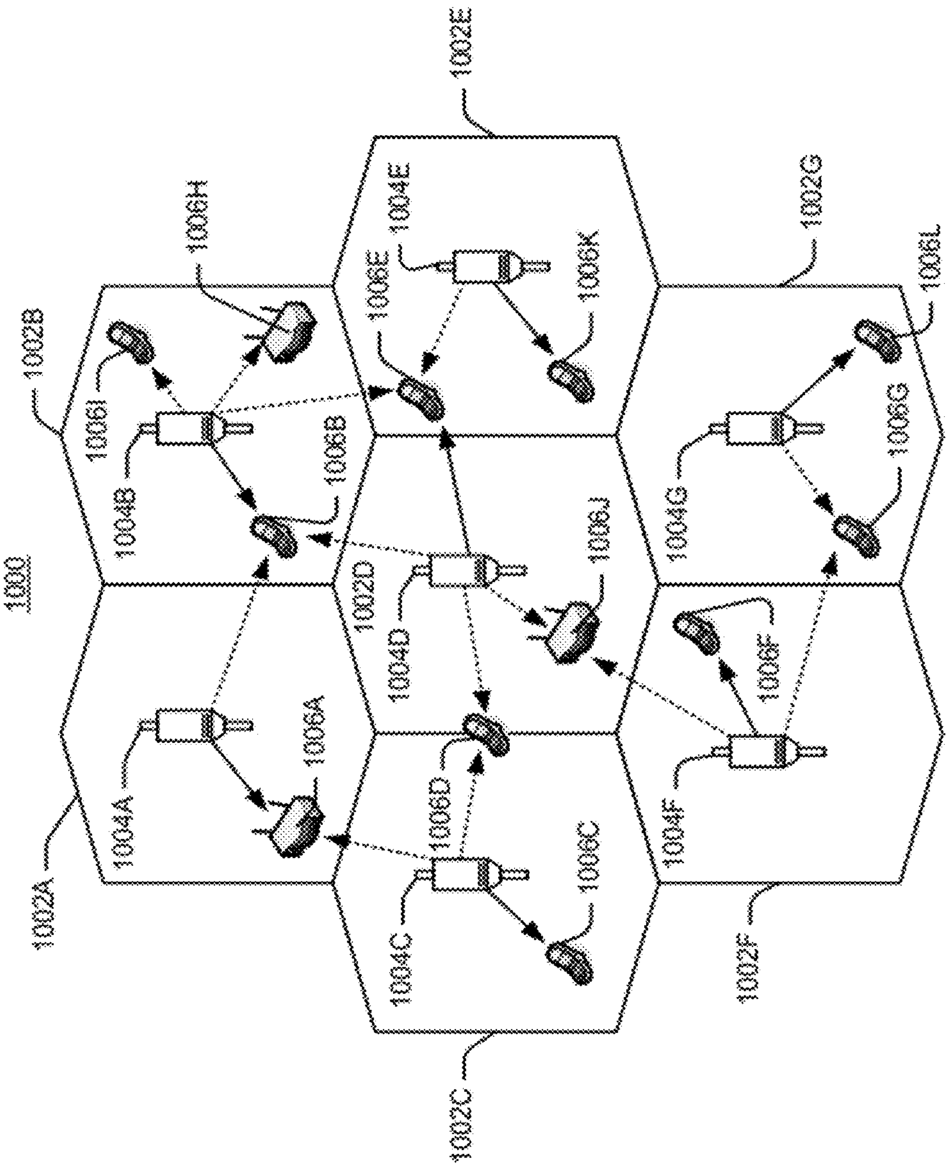
FIG. 10 is a simplified diagram of a wireless communication system.

FIG. 10 illustrates a wireless communication system 1000, configured to support a number of users, in which the teachings herein may be implemented. The system 1000 provides communication for multiple cells 1002, such as, for example, macro cells 1002A-1002G, with each cell being serviced by a corresponding access point 1004 (e.g., access points 1004A-1004G). As shown in FIG. 10, access terminals 1006 (e.g., access terminals 1006A-1006L) may be dispersed at various locations throughout the system over time. Each access terminal 1006 may communicate with one or more access points 1004 on a forward link (FL) and/or a reverse link (RL) at a given moment, depending upon whether the access terminal 1006 is active and whether it is in soft handoff, for example. The wireless communication system 1000 may provide service over a large geographic region. For example, macro cells 1002A-1002G may cover a few blocks in a neighborhood or several miles in a rural environment.

Figure 11:
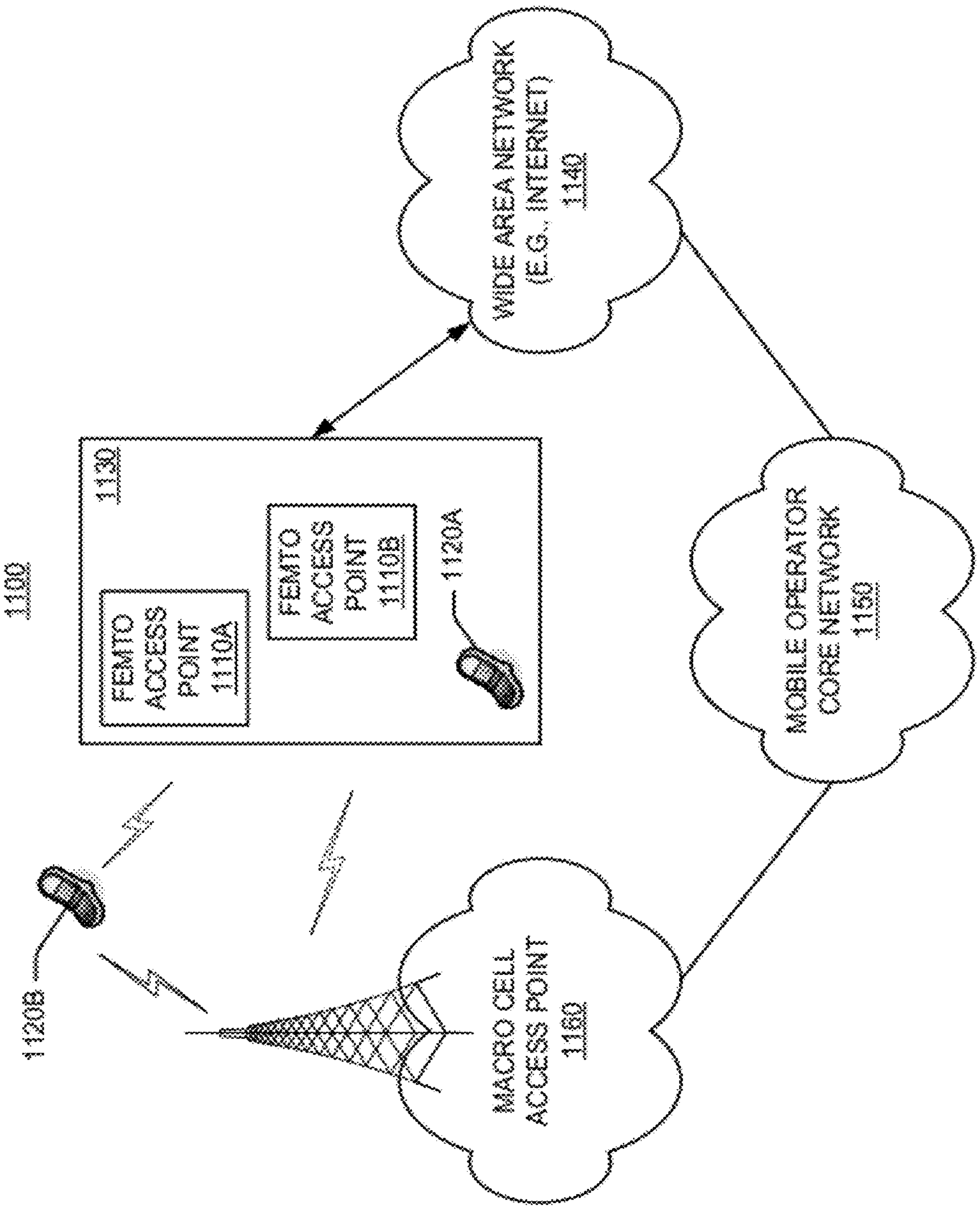
FIG. 11 is a simplified diagram of a wireless communication system including femto nodes.

FIG. 11 illustrates an exemplary communication system 1100 where one or more femto access points are deployed within a network environment. Specifically, the system 1100 includes multiple femto access points 1110 (e.g., femto access points 1110A and 1110B) installed in a relatively small scale network environment (e.g., in one or more user residences 1130). Each femto access point 1110 may be coupled to a wide area network 1140 (e.g., the Internet) and a mobile operator core network 1150 via a DSL router, a cable modem, a wireless link, or other connectivity means (not shown). As will be discussed below, each femto access point 1110 may be configured to serve associated access terminals 1120 (e.g., access terminal 1120A) and, optionally, other (e.g., hybrid or alien) access terminals 1120 (e.g., access terminal 1120B). In other words, access to femto access points 1110 may be restricted whereby a given access terminal 1120 may be served by a set of designated (e.g., home) femto access point(s) 1110 but may not be served by any non-designated femto access points 1110 (e.g., a neighbor's femto access point 1110).

Figure 12:
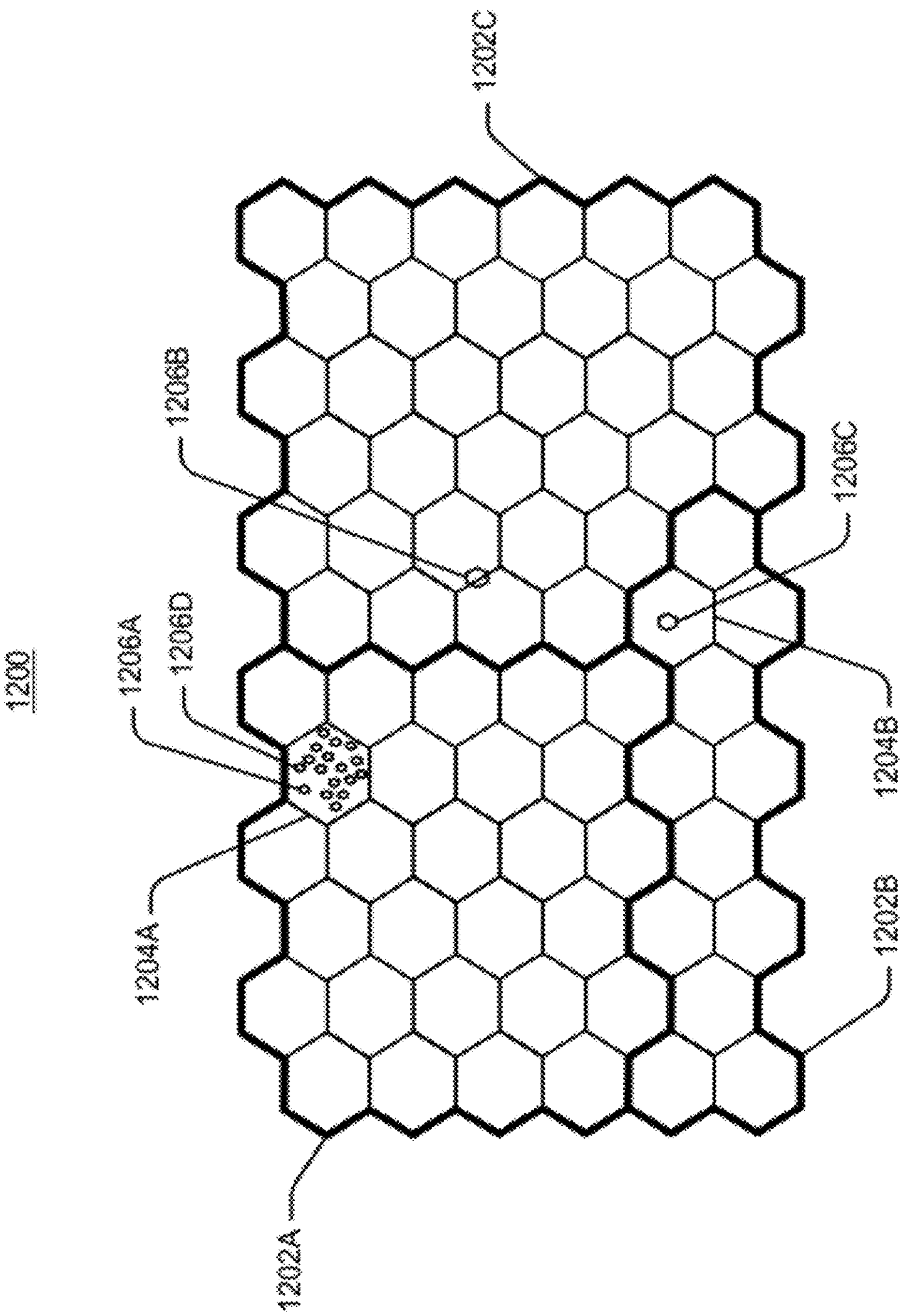
FIG. 12 is a simplified diagram illustrating coverage areas for wireless communication.

FIG. 12 illustrates an example of a coverage map 1200 where several tracking areas 1202 (or routing areas or location areas) are defined, each of which includes several macro coverage areas 1204. Here, areas of coverage associated with tracking areas 1202A, 1202B, and 1202C are delineated by the wide lines and the macro coverage areas 1204 are represented by the larger hexagons. The tracking areas 1202 also include femto coverage areas 1206. In this example, each of the femto coverage areas 1206 (e.g., femto coverage areas 1206B and 1206C) is depicted within one or more macro coverage areas 1204 (e.g., macro coverage areas 1204A and 1204B). It should be appreciated, however, that some or all of a femto coverage area 1206 may not lie within a macro coverage area 1204. In practice, a large number of femto coverage areas 1206 (e.g., femto coverage areas 1206A and 1206D) may be defined within a given tracking area 1202 or macro coverage area 1204. Also, one or more pico coverage areas (not shown) may be defined within a given tracking area 1202 or macro coverage area 1204.

Referring again to FIG. 11, the owner of a femto access point 1110 may subscribe to mobile service, such as, for example, 3G mobile service, offered through the mobile operator core network 1150. In addition, an access terminal 1120 may be capable of operating both in macro environments and in smaller scale (e.g., residential) network environments. In other words, depending on the current location of the access terminal 1120, the access terminal 1120 may be served by a macro cell access point 1160 associated with the mobile operator core network 1150 or by any one of a set of femto access points 1110 (e.g., the femto access points 1110A and 1110B that reside within a corresponding user residence 1130). For example, when a subscriber is outside his home, he is served by a standard macro access point (e.g., access point 1160) and when the subscriber is at home, he is served by a femto access point (e.g., access point 1110A). Here, a femto access point 1110 may be backward compatible with legacy access terminals 1120.

A femto access point 1110 may be deployed on a single frequency or, in the alternative, on multiple frequencies. Depending on the particular configuration, the single frequency or one or more of the multiple frequencies may overlap with one or more frequencies used by a macro access point (e.g., access point 1160).

In some aspects, an access terminal 1120 may be configured to connect to a preferred femto access point (e.g., the home femto access point of the access terminal 1120) whenever such connectivity is possible. For example, whenever the access terminal 1120A is within the user's residence 1130, it may be desired that the access terminal 1120A communicate only with the home femto access point 1110A or 1110B.

In some aspects, if the access terminal 1120 operates within the macro cellular network 1150 but is not residing on its most preferred network (e.g., as defined in a preferred roaming list), the access terminal 1120 may continue to search for the most preferred network (e.g., the preferred femto access point 1110) using a better system reselection (BSR) procedure, which may involve a periodic scanning of available systems to determine whether better systems are currently available and subsequently acquire such preferred systems. The access terminal 1120 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1110, the access terminal 1120 selects the femto access point 1110 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1110 that reside within the corresponding user residence 1130). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \le \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 13:
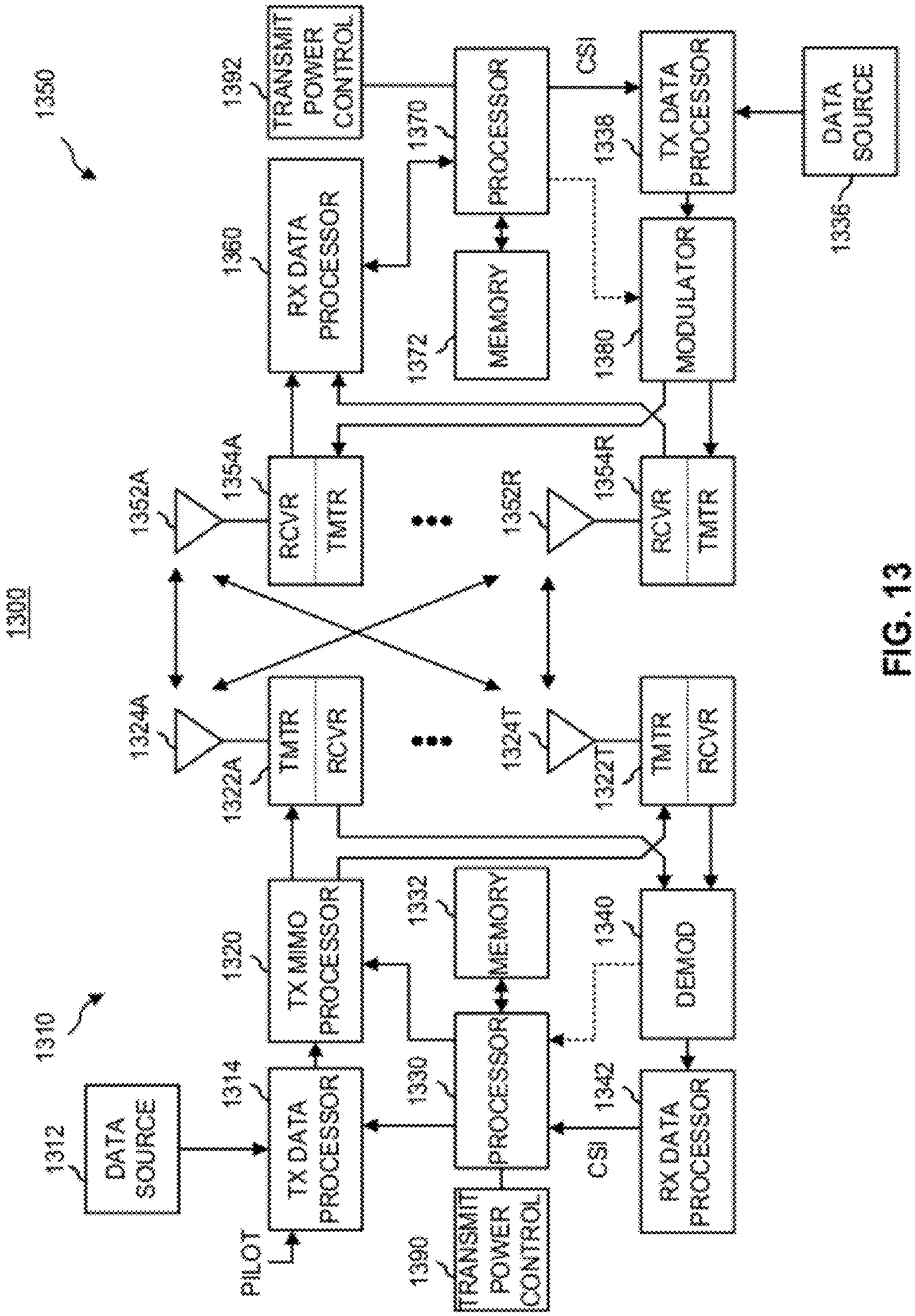
FIG. 13 is a simplified block diagram of several sample aspects of communication components.
Figure 14:
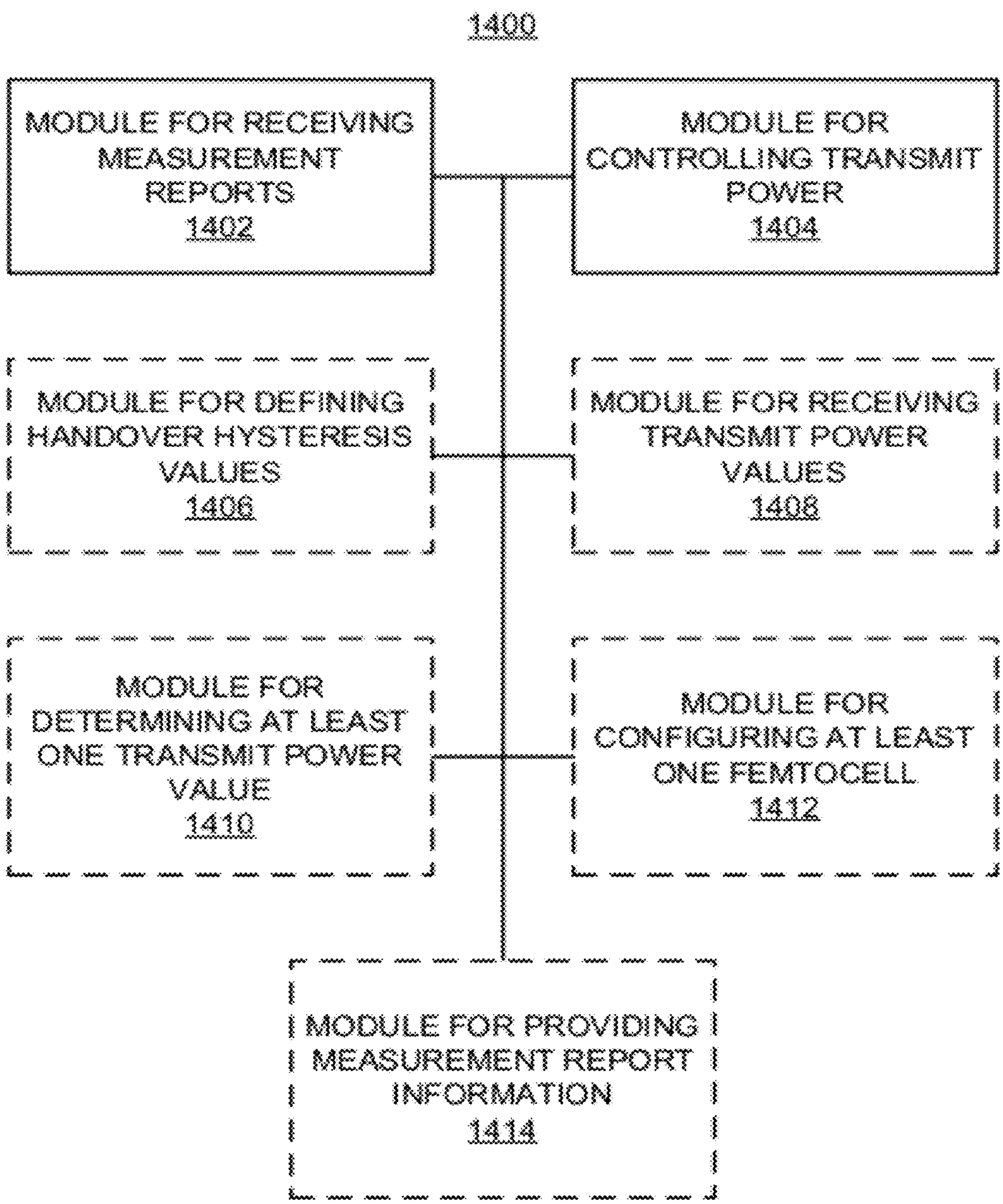
FIGS. 14-17 are simplified block diagrams of several sample aspects of apparatuses configured to control transmit power as taught herein.
Figure 15:
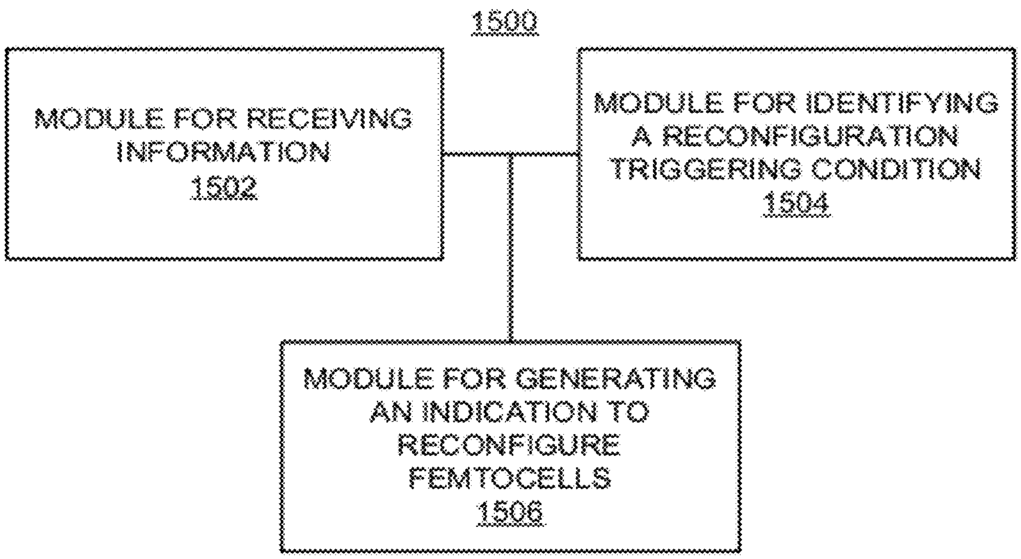
Figure 16:
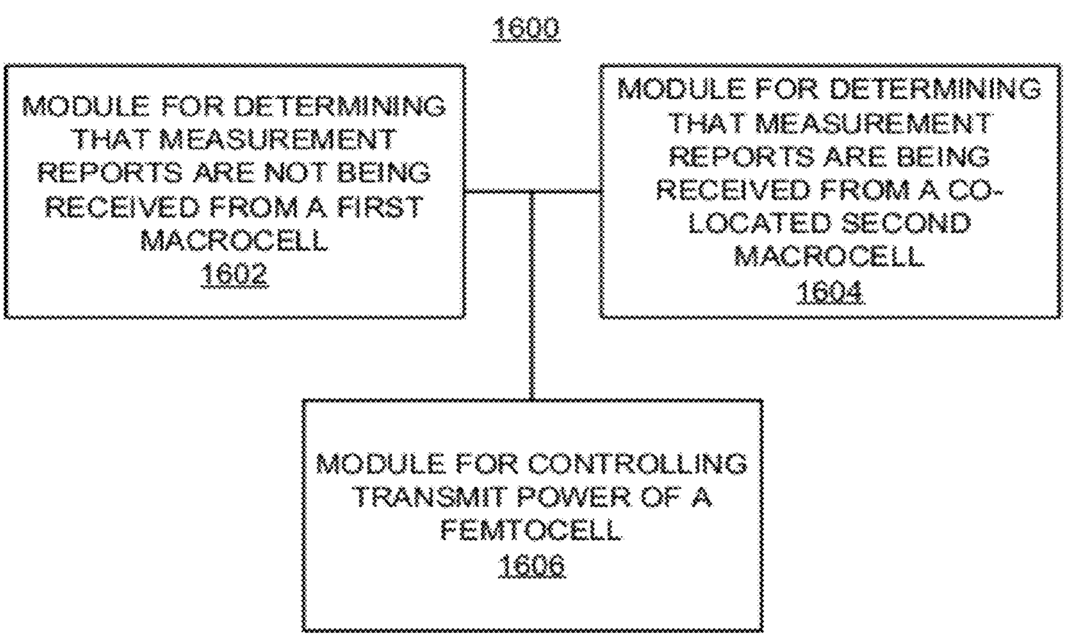
Figure 17:
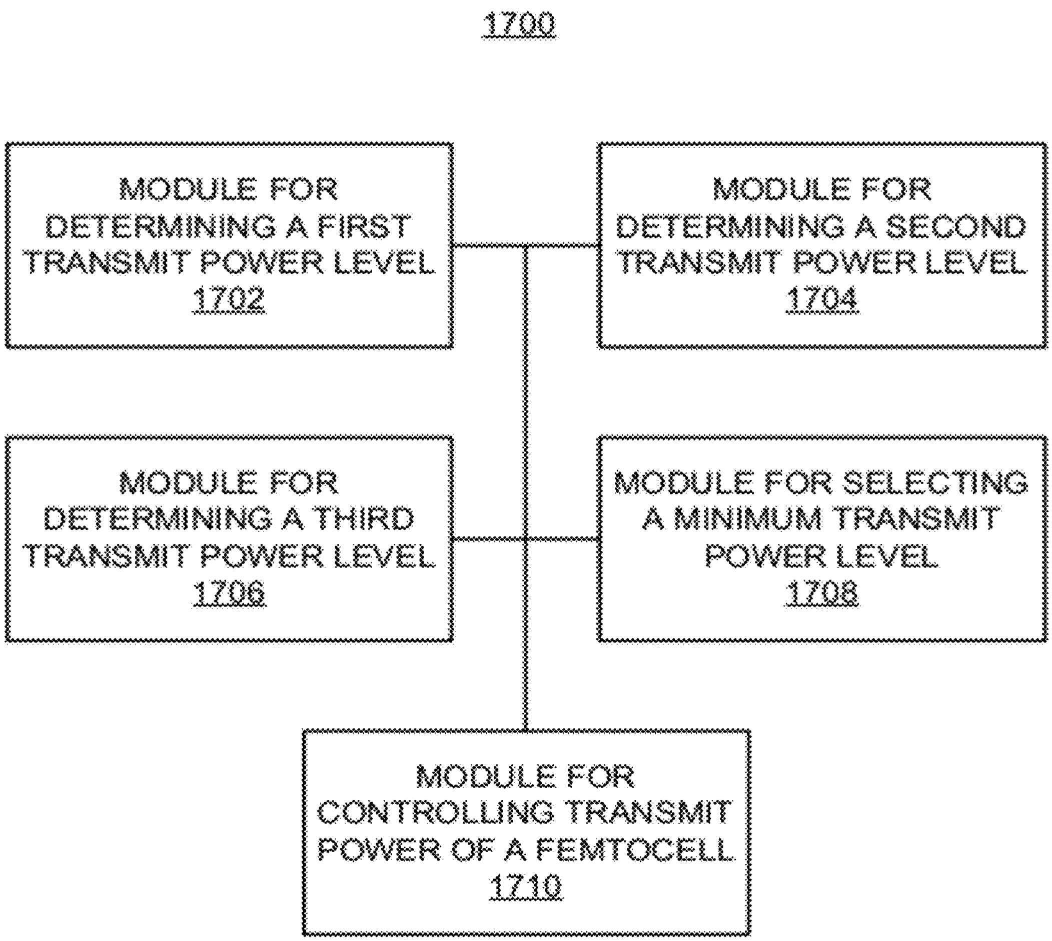

FIG. 13 illustrates a wireless device 1310 (e.g., an access point) and a wireless device 1350 (e.g., an access terminal) of a sample MIMO system 1300. At the device 1310, traffic data for a number of data streams is provided from a data source 1312 to a transmit (TX) data processor 1314. Each data stream may then be transmitted over a respective transmit antenna.

The TX data processor 1314 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1330. A data memory 1332 may store program code, data, and other information used by the processor 1330 or other components of the device 1310.

The modulation symbols for all data streams are then provided to a TX MIMO processor 1320, which may further process the modulation symbols (e.g., for OFDM). The TX MIMO processor 1320 then provides $N_T$ modulation symbol streams to $N_T$ transceivers (XCVR) 1322A through 1322T. In some aspects, the TX MIMO processor 1320 applies beam-forming weights to the symbols of the data streams and to the antenna from which the symbol is being transmitted.

Each transceiver 1322 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1322A through 1322T are then transmitted from $N_T$ antennas 1324A through 1324T, respectively.

At the device 1350, the transmitted modulated signals are received by $N_R$ antennas 1352A through 1352R and the received signal from each antenna 1352 is provided to a respective transceiver (XCVR) 1354A through 1354R. Each transceiver 1354 conditions (e.g., filters, amplifies, and downconverts) a respective received signal, digitizes the conditioned signal to provide samples, and further processes the samples to provide a corresponding "received" symbol stream.

A receive (RX) data processor 1360 then receives and processes the $N_R$ received symbol streams from $N_R$ transceivers 1354 based on a particular receiver processing technique to provide $N_T$ "detected" symbol streams. The RX data processor 1360 then demodulates, deinterleaves, and decodes each detected symbol stream to recover the traffic data for the data stream. The processing by the RX data processor 1360 is complementary to that performed by the TX MIMO processor 1320 and the TX data processor 1314 at the device 1310.

A processor 1370 periodically determines which pre-coding matrix to use (discussed below). The processor 1370 formulates a reverse link message comprising a matrix index portion and a rank value portion. A data memory 1372 may store program code, data, and other information used by the processor 1370 or other components of the device 1350.

The reverse link message may comprise various types of information regarding the communication link and/or the received data stream. The reverse link message is then processed by a TX data processor 1338, which also receives traffic data for a number of data streams from a data source 1336, modulated by a modulator 1380, conditioned by the transceivers 1354A through 1354R, and transmitted back to the device 1310.

At the device 1310, the modulated signals from the device 1350 are received by the antennas 1324, conditioned by the transceivers 1322, demodulated by a demodulator (DEMOD) 1340, and processed by a RX data processor 1342 to extract the reverse link message transmitted by the device 1350. The processor 1330 then determines which pre-coding matrix to use for determining the beam-forming weights then processes the extracted message.

FIG. 13 also illustrates that the communication components may include one or more components that perform transmit power control operations as taught herein. For example, a transmit power control component 1390 may cooperate with the processor 1330 and/or other components of the device 1310 to control transmit power for transmissions by the device 1310 (e.g., transmissions to another device such as the device 1350) and/or at least one other device as taught herein. Also, a transmit power control component 1392 may cooperate with the processor 1370 and/or other components of the device 1350 to assist with transmit power control operations (e.g., for transmissions by the device 1310 and/or other devices) as taught herein. It should be appreciated that for each device 1310 and 1350 the functionality of two or more of the described components may be provided by a single component. For example, a single processing component may provide the functionality of the transmit power control component 1390 and the processor 1330. Similarly, a single processing component may provide the functionality of the transmit power control component 1392 and the processor 1370.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macrocell, a macro node, a Home eNB (HeNB), a femtocell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 14, 15, 16, and 17, apparatuses 1400, 1500, 1600, and 1700 are represented as a series of interrelated functional modules. Here, a module for receiving measurement reports 1402 may correspond at least in some aspects to, for example, a receiver as discussed herein. A module for controlling transmit power 1404 may correspond at least in some aspects to, for example, a processing system as discussed herein. A module for defining handover hysteresis values 1406 may correspond at least in some aspects to, for example, a processing system as discussed herein. A module for receiving transmit power values 1408 may correspond at least in some aspects to, for example, a receiver as discussed herein. A module for determining at least one transmit power value 1410 may correspond at least in some aspects to, for example, a processing system as discussed herein. A module for configuring at least one femtocell 1412 may correspond at least in some aspects to, for example, a processing system as discussed herein. A module for providing measurement report information 1414 may correspond at least in some aspects to, for example, a processing system as discussed herein. A module for receiving information 1502 may correspond at least in some aspects to, for example, a receiver as discussed herein. A module for identifying a reconfiguration triggering condition 1504 may correspond at least in some aspects to, for example, a processing system as discussed herein. A module for generating an indication to reconfigure femtocells 1506 may correspond at least in some aspects to, for example, a processing system as discussed herein. A module for determining that measurements reports are not being received from a first macrocell 1602 may correspond at least in some aspects to, for example, a processing system as discussed herein. A module for determining that measurements reports are being received from a second macrocell 1604 may correspond at least in some aspects to, for example, a processing system as discussed herein. A module for controlling transmit power of a femtocell 1606 may correspond at least in some aspects to, for example, a processing system as discussed herein. A module for determining a first transmit power level 1702 may correspond at least in some aspects to, for example, a processing system as discussed herein. A module for determining a second transmit power level 1704 may correspond at least in some aspects to, for example, a processing system as discussed herein. A module for determining a third transmit power level 1706 may correspond at least in some aspects to, for example, a processing system as discussed herein. A module for selecting a minimum transmit power level 1708 may correspond at least in some aspects to, for example, a processing system as discussed herein. A module for controlling transmit power of a femtocell 1710 may correspond at least in some aspects to, for example, a processing system as discussed herein.

The functionality of the modules of FIGS. 14, 15, 16, and 17 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 14, 15, 16, and 17 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and BLU-RAY disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A communication apparatus, comprising:

a processing system comprising at least one processing circuit configured to:

determine that measurement reports associated with a first macrocell identifier are not being received on a first frequency from a first macrocell;

determine that measurement reports associated with the first macrocell identifier are being received on a second frequency for a second macrocell that is co-located with the first macrocell; and control transmit power of a femtocell on the first frequency based on the measurement reports received for the second macrocell, wherein the controlling the transmit power is further based on the determination that measurement reports are not being received from the first macrocell.

2. The communication apparatus of claim 1, wherein the measurement reports are received for the second macrocell via an access terminal that is performing a training walk calibration procedure for a network of femtocells.

3. The communication apparatus of claim 2, wherein the transmit power is controlled to meet a handover criterion, an SNR criterion, a macrocell protection criterion, a pilot signal quality criterion, or an adjacent channel protection criterion.

4. The communication apparatus of claim 1, wherein the measurement reports are received for the second macrocell via a network listen module during a procedure that initializes transmit power for a training walk calibration procedure for a network of femtocells.

5. The communication apparatus of claim 1, wherein measurement reports are not being received from the first macrocell due to interference from the femtocell.

6. The communication apparatus of claim 1, wherein measurement reports are not being received from the first macrocell due to interference from at least one other femtocell.

7. The communication apparatus of claim 1, wherein the communication apparatus comprises the femtocell.

8. The communication apparatus of claim 1, wherein the communication apparatus is a network entity.

9. A power control method, comprising:

determining that measurement reports associated with a first macrocell identifier are not being received on a first frequency from a first macrocell;

determining that measurement reports associated with the first macrocell identifier are being received on a second frequency for a second macrocell that is co-located with the first macrocell; and controlling transmit power of a femtocell on the first frequency based on the measurement reports received for the second macrocell, wherein the controlling the transmit power is further based on the determination that measurement reports are not being received from the first macrocell.

10. The method of claim 9, wherein the measurement reports are received for the second macrocell via an access terminal that is performing a training walk calibration procedure for a network of femtocells.

11. The method of claim 10, wherein the transmit power is controlled to meet a handover criterion, an SNR criterion, a macrocell protection criterion, a pilot signal quality criterion, or an adjacent channel protection criterion.

12. The method of claim 9, wherein the measurement reports are received for the second macrocell via a network listen module during a procedure that initializes transmit power for a training walk calibration procedure for a network of femtocells.

13. The method of claim 9, wherein measurement reports are not being received from the first macrocell due to interference from the femtocell.

14. The method of claim 9, wherein measurement reports are not being received from the first macrocell due to interference from at least one other femtocell.

15. A communication apparatus, comprising:

means for determining that measurement reports associated with a first macrocell identifier are not being received on a first frequency from a first macrocell;

means for determining that measurement reports associated with the first macrocell identifier are being received on a second frequency for a second macrocell that is co-located with the first macrocell; and means for controlling transmit power of a femtocell on the first frequency based on the measurement reports received for the second macrocell, wherein the controlling of the transmit power is further based on the determination that measurement reports are not being received from the first macrocell.

16. The communication apparatus of claim 15, wherein the measurement reports are received for the second macrocell via an access terminal that is performing a training walk calibration procedure for a network of femtocells.

17. The communication apparatus of claim 15, wherein the transmit power is controlled to meet a handover criterion, an SNR criterion, a macrocell protection criterion, a pilot signal quality criterion, or an adjacent channel protection criterion.

18. The communication apparatus of claim 15, wherein the measurement reports are received for the second macrocell via a network listen module during a procedure that initializes transmit power for a training walk calibration procedure for a network of femtocells.

19. A non-transitory computer-readable medium comprising code for causing a computer to:

determine that measurement reports associated with a first macrocell identifier are not being received on a first frequency from a first macrocell;

determine that measurement reports associated with the first macrocell identifier are being received on a second frequency for a second macrocell that is co-located with the first macrocell; and control transmit power of a femtocell on the first frequency based on the measurement reports received for the second macrocell, wherein the controlling the transmit power is further based on the determination that measurement reports are not being received from the first macrocell.

20. The computer-readable medium of claim 19, wherein the measurement reports are received for the second macrocell via an access terminal that is performing a training walk calibration procedure for a network of femtocells.

21. The computer-readable medium of claim 19, wherein the transmit power is controlled to meet a handover criterion, an SNR criterion, a macrocell protection criterion, a pilot signal quality criterion, or an adjacent channel protection criterion.

22. The computer-readable medium of claim 19, wherein the measurement reports are received for the second macrocell via a network listen module during a procedure that initializes transmit power for a training walk calibration procedure for a network of femtocells.

23. A communication apparatus, comprising;

a processing system comprising at least one processing circuit configured to:

determine that measurement reports associated with a first macrocell identifier are not being received on a first frequency from a first macrocell;

determine that measurement reports associated with the first macrocell identifier are being received on a second frequency for a second macrocell that is co-located with the first macrocell; and control transmit power of a femtocell on the first frequency based on the measurement reports received for the second macrocell, wherein the controlling the transmit power is further based on the determination that measurement reports are not being received from the first macrocell, wherein the processing system controls the transmit power at least in part by:

determining a first transmit power level that meets a coverage criterion for wireless communication on the first frequency by the femtocell, wherein the femtocell is associated with a first wireless network operator;

determining a second transmit power level that meets a first interference criterion corresponding to adjacent channel wireless communication associated with a second wireless network operator;

determining a third transmit power level that meets a second interference criterion corresponding to adjacent channel wireless communication associated with the first wireless network operator;

selecting a minimum transmit power level from the first transmit power level, the second transmit power level, and the third transmit power level; and controlling the transmit power of the femtocell on the first frequency based on the minimum transmit power level.

24. The communication apparatus of claim 23, wherein the coverage criterion is based on a received pilot signal quality level at a defined path loss from the femtocell.

25. The communication apparatus of claim 23, wherein the first interference criterion is based on a comparison of a received pilot signal power value with a total received power value.

26. The communication apparatus of claim 23, wherein the second interference criterion is based on a comparison of a received pilot signal power value with a threshold.

27. The communication apparatus of claim 23, wherein the first, second, and third transmit power levels are determined based on measurement reports received via an access terminal that is performing a training walk calibration procedure for a network of femtocells.

28. The communication apparatus of claim 23, wherein the first, second, and third transmit power levels are determined based on measurement reports received via a network listen module during a procedure that initializes transmit power for a training walk calibration procedure for a network of femtocells.

29. A power control method, comprising:

determining that measurement reports associated with a first macrocell identifier are not being received on a first frequency from a first macrocell;

determining that measurement reports associated with the first macrocell identifier are being received on a second frequency for a second macrocell that is co-located with the first macrocell; and controlling transmit power of a femtocell on the first frequency based on the measurement reports received for the second macrocell, wherein the controlling the transmit power is further based on the determination that measurement reports are not being received from the first macrocell, wherein controlling the transmit power of the femtocell comprises:

determining a first transmit power level that meets a coverage criterion for wireless communication on the first frequency by the femtocell, wherein the femtocell is associated with a first wireless network operator;

determining a second transmit power level that meets a first interference criterion corresponding to adjacent channel wireless communication associated with a second wireless network operator;

determining a third transmit power level that meets a second interference criterion corresponding to adjacent channel wireless communication associated with the first wireless network operator;

selecting a minimum transmit power level from the first transmit power level, the second transmit power level, and the third transmit power level; and controlling the transmit power of the femtocell on the first frequency based on the minimum transmit power level.

30. The method of claim 29, wherein the coverage criterion is based on a received pilot signal quality level at a defined path loss from the femtocell.

31. The method of claim 29, wherein the first interference criterion is based on a comparison of a received pilot signal power value with a total received power value.

32. The method of claim 29, wherein the second interference criterion is based on a comparison of a received pilot signal power value with a threshold.

33. The method of claim 29, wherein the first, second, and third transmit power levels are determined based on measurement reports received via an access terminal that is performing a training walk calibration procedure for a network of femtocells.

34. The method of claim 29, wherein the first, second, and third transmit power levels are determined based on measurement reports received via a network listen module during a procedure that initializes transmit power for a training walk calibration procedure for a network of femtocells.

35. A communication apparatus, comprising:

means for determining that measurement reports associated with a first macrocell identifier are not being received on a first frequency from a first macrocell;

means for determining that measurement reports associated with the first macrocell identifier are being received on a second frequency for a second macrocell that is co-located with the first macrocell; and means for controlling transmit power of a femtocell on the first frequency based on the measurement reports received for the second macrocell, wherein the controlling of the transmit power is further based on the determination that measurement reports are not being received from the first macrocell, wherein the means for controlling controls the transmit power of the femtocell at least in part by:

determining a first transmit power level that meets a coverage criterion for wireless communication on the first frequency by the femtocell, wherein the femtocell is associated with a first wireless network operator;

determining a second transmit power level that meets a first interference criterion corresponding to adjacent channel wireless communication associated with a second wireless network operator;

determining a third transmit power level that meets a second interference criterion corresponding to adjacent channel wireless communication associated with the first wireless network operator;

selecting a minimum transmit power level from the first transmit power level, the second transmit power level, and the third transmit power level; and controlling the transmit power of the femtocell on the first frequency based on the minimum transmit power level.

36. The communication apparatus of claim 35, wherein the coverage criterion is based on a received pilot signal quality level at a defined path loss from the femtocell.

37. The communication apparatus of claim 35, wherein the first interference criterion is based on a comparison of a received pilot signal power value with a total received power value.

38. The communication apparatus of claim 35, wherein the second interference criterion is based on a comparison of a received pilot signal power value with a threshold.

39. A non-transitory computer-readable medium comprising code for causing a computer to:

determine that measurement reports associated with a first macrocell identifier are not being received on a first frequency from a first macrocell;

determine that measurement reports associated with the first macrocell identifier are being received on a second frequency for a second macrocell that is co-located with the first macrocell; and control transmit power of a femtocell on the first frequency based on the measurement reports received for the second macrocell, wherein the controlling the transmit power is further based on the determination that measurement reports are not being received from the first macrocell, wherein the code for causing the computer to control the transmit power of the femtocell causes the computer to:

determine a first transmit power level that meets a coverage criterion for wireless communication on the first frequency by the femtocell, wherein the femtocell is associated with a first wireless network operator;

determine a second transmit power level that meets a first interference criterion corresponding to adjacent channel wireless communication associated with a second wireless network operator;

determine a third transmit power level that meets a second interference criterion corresponding to adjacent channel wireless communication associated with the first wireless network operator;

select a minimum transmit power level from the first transmit power level, the second transmit power level, and the third transmit power level; and control the transmit power of the femtocell on the first frequency based on the minimum transmit power level.

40. The computer-readable medium of claim 39, wherein the coverage criterion is based on a received pilot signal quality level at a defined path loss from the femtocell.

41. The computer-readable medium of claim 39, wherein the first interference criterion is based on a comparison of a received pilot signal power value with a total received power value.

42. The computer-readable medium of claim 39, wherein the second interference criterion is based on a comparison of a received pilot signal power value with a threshold.

43. The communication apparatus of claim 2, wherein the at least one processing circuit is further configured to provide the measurement reports to a training walk-based power calibration and determine to control the transmit power of the femtocell on the first frequency based at least in part on the training walk-based power calibration.

* * * * *